US012719789B2

(12) United States Patent
Yang et al.

(10) Patent No.: US 12,719,789 B2
(45) Date of Patent: Aug. 25, 2026

(54) SYSTEMS AND METHODS FOR SUPPORTING COMMUNICATION BETWEEN USER EQUIPMENTS (UES) CAMPING ON A LOCAL AREA NETWORK (LAN)

(71) Applicant: Telefonaktiebolaget LM Ericsson (publ), Stockholm (SE)

(72) Inventors: Yong Yang, Kållered (SE); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 822 days.

(21) Appl. No.: 17/422,955

(22) PCT Filed: Dec. 18, 2019

(86) PCT No.: PCT/EP2019/086086
§ 371 (c)(1),
(2) Date: Jul. 14, 2021

(87) PCT Pub. No.: WO2020/148062
PCT Pub. Date: Jul. 23, 2020

(65) Prior Publication Data

US 2022/0150166 A1 May 12, 2022

Related U.S. Application Data

(60) Provisional application No. 62/806,996, filed on Feb. 18, 2019, provisional application No. 62/792,551, filed on Jan. 15, 2019.

(51) Int. Cl.

| | |
|---|---|
| ***H04L 45/74*** | (2022.01) |
| ***H04L 12/46*** | (2006.01) |
| ***H04L 69/22*** | (2022.01) |

(52) U.S. Cl.
CPC .......... *H04L 45/74* (2013.01); *H04L 12/4633* (2013.01); *H04L 69/22* (2013.01)

(58) Field of Classification Search
CPC . H04L 45/74; H04L 12/4633; H04L 12/4645; H04L 69/22
See application file for complete search history.

(56) References Cited

U.S. PATENT DOCUMENTS

| | | | |
|---|---|---|---|
| 9,106,546 | B1 | 8/2015 | Naik et al. |
| 10,708,757 | B2 | 7/2020 | Xu et al. |

(Continued)

FOREIGN PATENT DOCUMENTS

| | | | |
|---|---|---|---|
| CN | 104885431 | A | 9/2015 |
| CN | 108605383 | A | 9/2018 |

(Continued)

OTHER PUBLICATIONS

International Search Report and Written Opinion issued in International Application No. PCT/EP2019/086086 dated Jun. 23, 2020 (17 pages).

(Continued)

*Primary Examiner* — Noel R Beharry
*Assistant Examiner* — Angelie T Ngo
(74) *Attorney, Agent, or Firm* — Rothwell, Figg, Ernst & Manbeck, P.C.

(57) ABSTRACT

The disclosure relates to systems and methods enabling an SMF (208) to control new forwarding behavior in the UPF (206) to support locally switched and Nx-based forwarding.

4 Claims, 19 Drawing Sheets

(56) References Cited

U.S. PATENT DOCUMENTS

| | | | | |
|---|---|---|---|---|
| 2014/0173018 | A1 | 6/2014 | Westphal et al. | |
| 2018/0192390 | A1 | 7/2018 | Li et al. | |
| 2018/0227743 | A1 | 8/2018 | Faccin et al. | |
| 2018/0279180 | A1 | 9/2018 | Lee et al. | |
| 2018/0352483 | A1 | 12/2018 | Youn et al. | |
| 2019/0335002 | A1* | 10/2019 | Bogineni | H04W 8/22 |
| 2020/0059761 | A1* | 2/2020 | Li | H04W 4/24 |
| 2021/0014164 | A1* | 1/2021 | Zhou | H04L 67/141 |
| 2021/0120479 | A1* | 4/2021 | Jing | H04W 36/08 |
| 2021/0120620 | A1* | 4/2021 | Wang | H04W 36/10 |
| 2021/0274323 | A1* | 9/2021 | Xu | H04W 4/08 |

FOREIGN PATENT DOCUMENTS

| | | | | |
|---|---|---|---|---|
| CN | 201811378645.3 | | * | 11/2018 |
| CN | 110324246 | A | * | 10/2019 |
| WO | 2018/128500 | A1 | | 7/2018 |
| WO | WO-2018137232 | A1 | * | 8/2018 |
| WO | 2018232759 | A1 | | 12/2018 |

OTHER PUBLICATIONS

IPRP issued in International Application No. PCT/EP2019/086086 dated Apr. 13, 2021 (72 pages).

3GPP TS 23.527 V15.0.0 (Sep. 2018), 3rd Generation Partnership Project; Technical Specification Group Core Network and Terminals; 5G System; Restoration Procedures (Release 15) Sep. 2018 (16 pages).

3GPP TS 23.501 V15.0.3 (Sep. 2018), 3rd Generation Partnership Project; Technical Specification Group Services and System Aspects; System Architecture for the 5G System; Stage 2 (Release 15) Sep. 2018 (226 pages).

3GPP TS 23.502 V15.3.0 (Sep. 2018), 3rd Generation Partnership Project; Technical Specification Group Services and System Aspects; Procedures for the 5G System; Stage 2 (Release 15) Sep. 2018 (330 pages).

3GPP TS 29.518 V15.1.0 (Sep. 2018), 3rd Generation Partnership Project; Technical Specification Group Core Network and Terminals; 5G System; Access and Mobility Management Services; Stage 3 (Release 15) Sep. 2018 (173 pages).

Ericsson, "Control of traffic forwarding in 5G-LAN", SA WG2 Meeting #130, S2-1901467, Koichi, India, Jan. 21-25, 2019 (6 pages).

Ericsson, "Control of traffic forwarding in 5G-LAN", 3GPP TSG-SA WG2 Meeting #131, S2-1901468, Santa Cruz, Tenerife, Spain Feb. 25-Mar. 1, 2019 (10 pages).

Fu-Qiang, Gu, "Local Real-time Positoning Algorithms and Methods for Improving Location Precision", China University of Geosciences, Wuhan, China, May 31, 2013 (71 pages).

Nokia et al., "23.716/ Update to Solution #10—Support of "combo Ethernet + IP" Service", SA WG2 Meeting #128b, S2-189040, Sophia-Antipolis, France, Aug. 2018 (7 pages).

3GPP TS 29.244 V15.4.0 (Dec. 2018), 3rd Generation Partnership Project; Technical Specification Group Core Network and Terminals; Interface between the Control lane and the User Plane Nodes; Stage 3 (Release 15), Dec. 2018 (pp. 1-50).

3GPP TS 23.501 V15.3.0 (Sep. 2018) (226 pages).

Huawei and HiSilicon, "5GLAN communication discussions", 3GPP TSG-SA WG2 Meeting #130, S2-1900595, Jan. 21-25, 2019, Kochi, India, Internet<URL:https://www.3gpp.org/ftp/tsg_sa/WG2_Arch/TSGS2_130_Kochi/Docs/S2-1900595.zip>, (6 pages).

* cited by examiner s502 receiving a transmission (e.g., GTP-U PDU) comprising a PDU transmitted by UE A (e.g., PDU 351) (hereafter “the UE PDU”), wherein the UE PDU includes at least a destination address of the second UE s504 using information included in the transmission to find a first PDR (e.g., PDR 304) matching information included in the transmission (e.g. a source address and a destination address of the UE PDU), wherein the first PDR identifies a first FAR (e.g., FAR 306)

s506 obtaining information included in the first FAR s508 identifying an N4 session s510 finding a default PDR associated with the N4 session

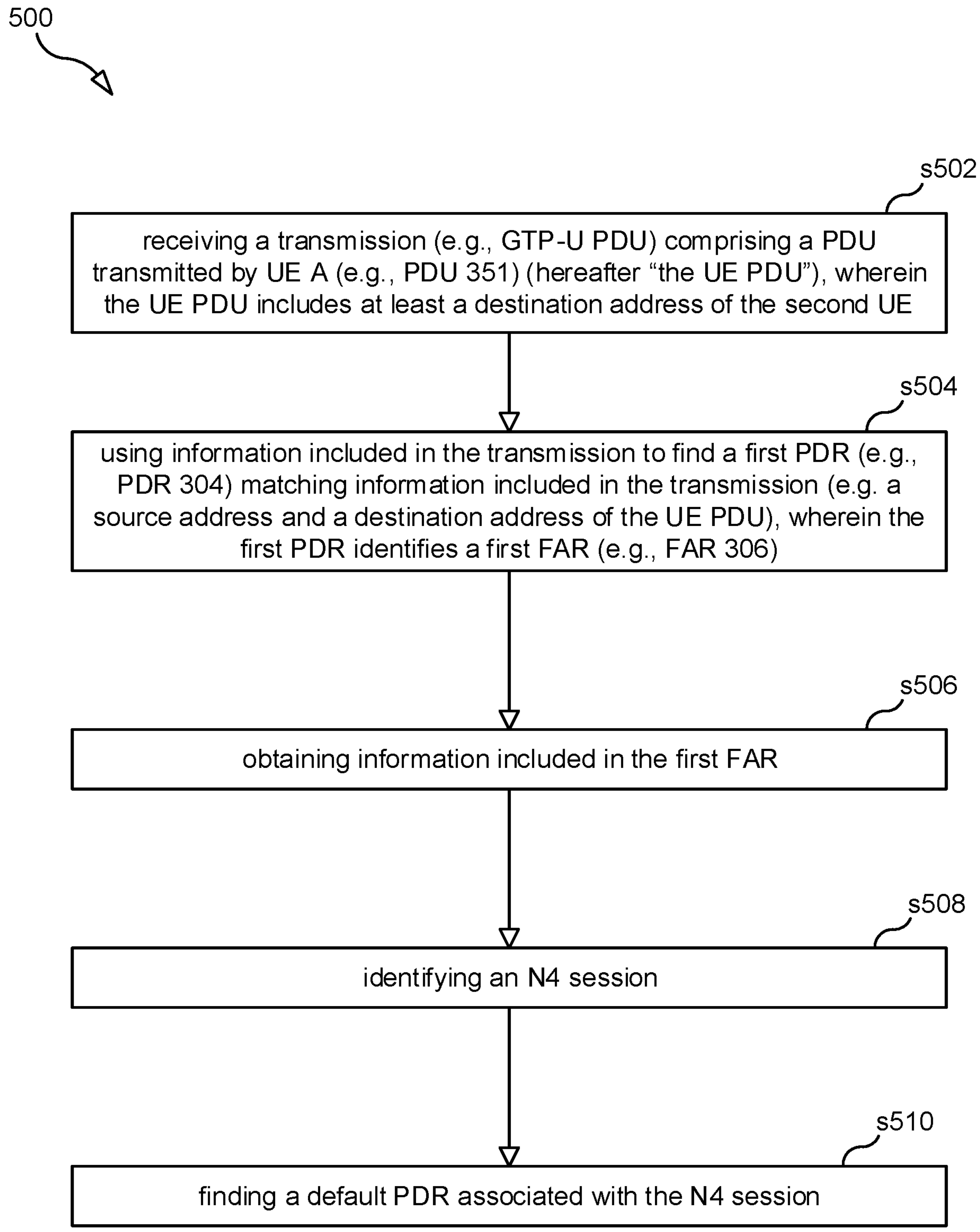

FIG. 5

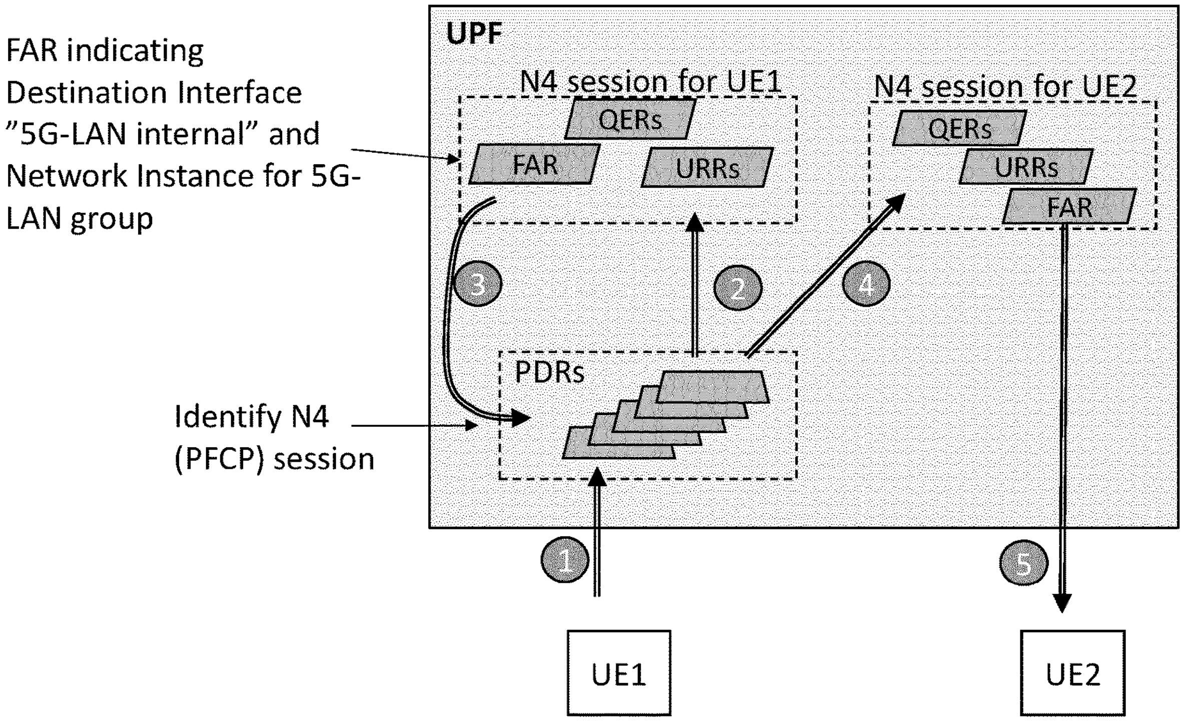
FIG. 17 Figure 1. Local switch in UPF

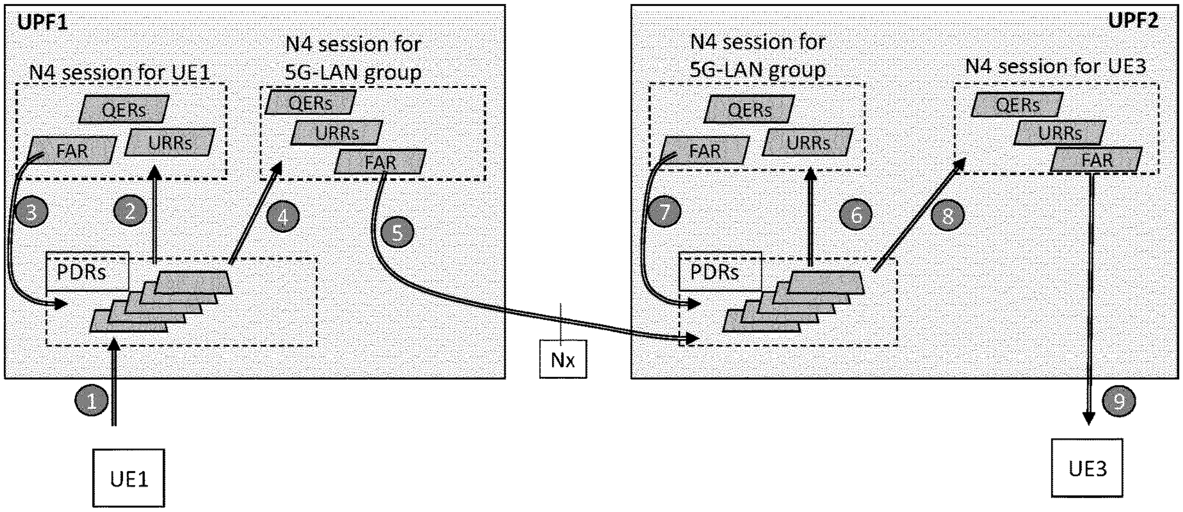
FIG. 18 Nx-based forwarding in UPF

SYSTEMS AND METHODS FOR SUPPORTING COMMUNICATION BETWEEN USER EQUIPMENTS (UES) CAMPING ON A LOCAL AREA NETWORK (LAN)

CROSS REFERENCE TO RELATED APPLICATIONS

This application is a 35 U.S.C. § 371 National Stage of International Patent Application No. PCT/EP2019/086086, filed Dec. 18, 2019, designating the United States and claiming priority to U.S. Provisional Patent Application No. 62/792,551, filed Jan. 15, 2019 and U.S. Provisional Patent Application No. 62/806,996, filed Feb. 18, 2019, which is incorporated by this reference herein in its entirety.

TECHNICAL FIELD

Disclosed are embodiments related to control and user plane management for communication between devices in a local area network (LAN) (e.g., a 5G LAN).

BACKGROUND

3GPP is currently standardizing the 5G Core Network as part of the overall 5G System architecture. FIG. 1 illustrates a 5G network architecture 100.

As seen from the access side, the 5G network architecture shown in FIG. 1 comprises a plurality of user equipment (UEs) (i.e., any device capable of wirelessly communicating with an access network, including smartphones, smart appliances, sensors, and other Internet-of-Things (IoT) devices) connected to an access network (AN) (e.g., a radio access network (RAN)), which is connected to an Access and Mobility Management Function (AMF). Typically, the AN comprises base stations, e.g. such as evolved Node Bs (eNBs) or 5G base stations (gNBs) or similar. Seen from the core network side, the 5G core network functions (NFs) shown in FIG. 1 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

In many respects, the 5G core network aims at separating user plane and control plane. The user plane typically carries user traffic while the control plane carries signaling in the network. In FIG. 1, a UPF is in the user plane and all other network functions (NFs) shown, i.e., AMF, SMF, PCF, AF, AUSF, and UDM, are in the control plane. Separating the user and control planes helps each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 1. Modularized function design enables the 5G core network to support various services flexibly.

Reference point representations of the 5G network architecture are used to develop detailed flows in the normative standardization.

3GPP SA2 has conducted a study on 5GS Enhanced support of Vertical and LAN Services and arrived at a solution described in subclause 6.29 and 8.3 (parts thereof are reproduced below) to be used as base for normative work.

6.29 Solution X: Unified architecture for 5G LAN-type service 6.29.1 Functional Description 6.29.1.1 General Description 5G LAN-type service is provided by the 5G system based on the architecture defined in rel-15, with the additional enhancement:

For the centralized user plane architecture:

- A single SMF and a single PSA UPF is responsible for all the PDU Sessions for 5G-LAN group communication.
- The SMF is responsible for managing the PDU sessions belonging to the 5G-LAN group, it includes the management for example the total number of established and activated PDU Sessions.
- All the traffic of participating 5G-LAN group member (i.e. UE) traverses the PSA UPF. PSA-UPF should support the enforcement of QoS per R15 QoS architecture.

For the distributed user plane architecture, i.e. PDU sessions for 5G-LAN group communication are controlled by a single SMF, and these PDU sessions may terminate in one or multiple UPFs:

- SMF enhancements: determine the traffic routing approach (e.g. local switch, between two UPFs via Nx interface, via N6 interface); configure packet handling rules (e.g. packet forwarding rules, packet marking rules) in the UPF to support 5G-LAN communication.
- Nx interface is introduced to connect two UPF for routing traffic of 5G-LAN-type service. The difference from N9 interface is, Nx interface is of a 5G-LAN group granularity, which means an Nx tunnel carries the traffic belonging to a 5G-LAN group communication.

6.29.1.2 5G-LAN group management

Void.

6.29.1.3 PDU Session Management 5G LAN-Type Service

UE can access the 5G LAN-type service by establishing a PDU Session targeting the DNN associated with the 5G-LAN group. The PDU session establishment request message (5G LAN-VN DNN, etc.) is sent from UE to the SMF, as defined in release 15. During establishment of the PDU Session, the SMF may contact the DN AAA in order to authenticate and authorize the UE for accessing 5G LAN-type service to the intended 5G-LAN group.

During PDU session establishment, the SMF determines the traffic routing approach by correlating all the PDU session contexts targeting the same DNN associated with the 5G-LAN group, (e.g. local switch, between two UPFs via Nx interface, via N6 interface).

6.29.1.4 Path Management of 5G-LAN Communication

SMF stores all the PDU session contexts targeting the same DNN associated with the 5G-LAN group. SMF stores the traffic routing policy for a 5G-LAN group which is retrieved from the PCF or locally configured.

There are types of traffic routing policies of 5G-LAN communication.

- N6-based, it means all the UL/DL traffic for the 5G-LAN communication is routed to/from the DN;

Nx based, it means all the UL/DL traffic for the 5G-LAN communication is routed between PSA UPFs of different PDU sessions Local switch: traffic routed locally by a single UPF if it is the common PSA UPF of different sessions;

SMF generates PDU forwarding rules and provides them to the UPF.

UPF enforces local traffic switching based on extension of the Release 15 mechanisms as described in TS 23.501 [3], clause 5.6.10.2 and clause 5.8.2.5. Alternatively, PDR and FAR provide information that may explicitly indicate whether an uplink traffic flow is routed to the DN or to another PDU session anchor UPF (via Nx interface) or locally routed.

The packets for different 5G-LAN group may be marked with respective VLAN tagging by UPF.

6.29.3 Impacts on Existing Entities and Interfaces

SMF is enhanced to determine the traffic routing approach for 5G-LAN type-service.

Nx interfaces optionally is supported between two UPFs, in order to achieve optimized routing for 5G LAN-type service.

Local switch is supported by UPF;

N4 interface is enhanced that SMF instructs UPF how to route the traffic for 5G-LAN type-service;

6.29.4 Evaluation

This solution supports N6-based, Nx-based and local switch type traffic routing of 5G LAN-type service. It provides sufficient support to address key issue 4 and 5.

8.3.1 Conclusion for Key Issue #4, #5

Solution #29 is concluded as the conclusion for key issue 4 and 5.

8.3.2 Conclusions for Key Issue #4.1 on 5G-LAN Group Management a) In this release it is assumed that the 5G-LAN Group Management can be configured by a network administrator (a.1) or can be managed dynamically by AF (a.2).

For both a.1) and a.2): GPSI is used to uniquely identify the 5G-LAN group member.

For a.1) only: The Group as described in clause 5.2.3.3.1 of TS 23.502 [4] is used to identify the 5G-LAN group.

For a.2) only: For dynamic 5G-LAN Group Management, the NEF shall expose a new set of service API to manage (e.g. add/delete) 5G-LAN group and 5G-LAN member.

b) The 5G-LAN configuration is provided by the AF to the NEF and is stored in the UDR, by using the NEF service operations information flow procedure described in TS 23.502 [4] clause 4.15.6.2.

c) The list of parameters in the 5G-LAN configuration includes at least the PDU session type (i.e. IP or Ethernet), DNN, S-NSSAI and GPSI of 5G-LAN group member UE (only for the case of a.2). Any additional parameters in the 5G-LAN configuration shall be determined as part of normative work.

d) Some of the 5G-LAN configuration stored in the UDR, i.e. PDU session type (i.e. IP or Ethernet), DNN and S-NSSAI is delivered to UE from the PCF using the UE Configuration Update procedure for transparent UE Policy delivery described in TS 23.502 [4] clause 4.2.4.3.

(Source: www.3gpp.org/ftp//Specs/archive/23_series/23.734/23734-100.zip)

SUMMARY

Certain challenges exist. As one example, there is a lack of procedure details on when different routing policies (e.g., N6-based, Local Switch and Nx-based policies) are used.

According to embodiments, systems and methods enable an SMF to control new forwarding behavior in the UPF to support locally switched and Nx-based forwarding. The solutions described herein also enable a UPF to efficiently handle direct forwarding between two Packet Forwarding Control Protocol (PFCP sessions) (a.k.a., N4 sessions), e.g. for a "local switch."

According to embodiments, a SMF can configure a UPF using PFCP signaling such that the UPF is able to forward traffic from one UE to another UE for the case when both UEs are served by the UPF ("local Switch"). This may include receiving user plane traffic with a destination towards another UE from a UE in the uplink direction, where the UPF is able to send the traffic in the downlink direction to another UE pertaining to the same 5G-LAN group. This may be accomplished without use of an external network DN, for instance, without N6.

According to some embodiments, a SMF can configure two or more UPFs using PFCP signaling so that the UPFs are able to forward the traffic from one UE to another, for the case when the UEs are served by different UPFs. This may be understood as "Nx-based forwarding." This may include receiving user plane traffic with a destination towards another UE from a UE in the uplink direction in the first UPF, where the first UPF is instructed to forward the traffic to a second UPF, which is instructed to send the traffic in the downlink direction to the destination UE pertaining to the same 5G-LAN group. In some instance, there may be one or more intermediate UPFs between the first and second UPFs.

In one aspect a method for supporting a local area network (LAN (e.g., a 5G LAN)) is provided. In one embodiment, the method includes a UPF receiving a transmission (e.g., a GTP-U PDU transmitted by a access network node or a PDU transmitted by another UPF over an Nx interface) comprising a protocol data unit, PDU, transmitted by a first user equipment, UE, wherein the PDU includes at least a destination address of a second UE. The method also includes the UPF using information included in the transmission to find a first packet detection rule, PDR, matching information included in the transmission (e.g. a source address and a destination address of the PDU), wherein the first PDR identifies a first forwarding action rule, FAR, wherein the first FAR includes an indication (e.g., Destination Interface set to "5G-LAN internal") indicating that the PDU requires further ingress processing (i.e., indicating that another PDR matching process is needed for the PDU). The method also includes the UPF enforcing the first FAR (e.g., sending the PDU to the UPF's routing engine using the network instance identifier and the 5G LAN Internal interface as included in the FAR, so that the routing engine can perform the another PDR matching process to find a second PDR for the PDU). The method also include the UPF finding a second PDR for the PDU (e.g., the second PDR is found after identifying a second N4 session for the PDU and by matching the PDU with packet detection information, PDI, included in the second PDR), wherein the second PDR identifies a second FAR. The method also includes the UPF enforcing the second FAR, wherein enforcing the second FAR comprises using information included in the second FAR to forward the PDU to the second UE.

In another embodiment, the method includes a UPF receiving a transmission (e.g., a GTP-U PDU transmitted by a access network node or a PDU transmitted by another UPF over an Nx interface) comprising a protocol data unit, PDU, transmitted by a first user equipment, UE, wherein the PDU includes at least a destination address of a second UE. The method also includes the UPF using information included in the transmission to find a first Packet Detection Rule, PDR, matching information included in the transmission (e.g. a source address and a destination address of the PDU), wherein the first PDR identifies a first forwarding action rule, FAR, wherein the first FAR includes an indication (e.g., Destination Interface set to "5G-LAN internal") indicating that the PDU requires further ingress processing (i.e., indicating that another PDR matching process is needed for the PDU). The method also includes the UPF obtaining information included in the first FAR (e.g., reading the value of the Destination Interface IE included in the FAR). The method also includes the UPF, after obtaining the information included the first FAR, identifying an N4 session. The method also includes the UPF, after identifying the N4 session, finding a default PDR associated with the N4 session, wherein the default PDR identifies a default FAR and/or a default URR, wherein the default FAR is configured to cause the UPF to transmit the PDU to a Session Management Function, SMF, or the default URR is configured to cause the UPF to transmit to the SMF a PFCP Session Report Request message comprising at least a portion of the PDU (e.g., the destination IP address included in an IP header of the PDU).

In another aspect there is provided methods performed by an SMF. In one embodiment, the method includes the SMF receiving a transmission transmitted by a first user plane function, UPF, as a result of the first UPF determining that a PDU is not routable, wherein the PDU includes a source address field containing an address of a first UE and a destination address field containing an address of a second UE, and wherein the transmission comprises 1) the PDU or 2) a PFCP Session Report Request message that comprises the address of the second UE. The method also includes the SMF determining a UPF that is currently serving the second UE. The method also includes the SMF, after determining the UPF that is currently serving the second UE, provisioning to the first UPF a PDR for enabling the first UPF to route towards the second UE PDUs that are addressed to the second UE.

In another embodiment, the method includes the SMF generating a first packet detection rule, PDR, associated with a first N4 session associated with a first UE or associated with a 5G LAN group, the first PDR containing a forwarding action rule, FAR, identifier for identifying a first FAR. The method also includes the SMF generating the first FAR, wherein the first FAR includes an indication (e.g., Destination Interface set to "5G-LAN internal") indicating that the PDUs that match the first PDR require further ingress processing (i.e., indicating that another PDR matching process is needed for the PDUs). The method also includes the SMF providing the first PDR and the first FAR to a first user plane function, UPF (e.g., the UPF selected to serve the first UE).

According to embodiments, network functionality may be implemented either as a network element on dedicated hardware, as a software instance running on a dedicated hardware, or as a virtualized function instantiated on an appropriate platform, e.g., a cloud infrastructure.

BRIEF DESCRIPTION OF THE DRAWINGS

The accompanying drawings, which are incorporated herein and form part of the specification, illustrate various embodiments.

FIGS. 4-13 are flow charts illustrating processes according to embodiments.

FIG. 17 is an exemplary schematic illustration of a local switch in UPF according to embodiments.

FIG. 18 is an exemplary schematic illustration of Nx-based forwarding in UPF according to embodiments.

DETAILED DESCRIPTION

Figure 1:
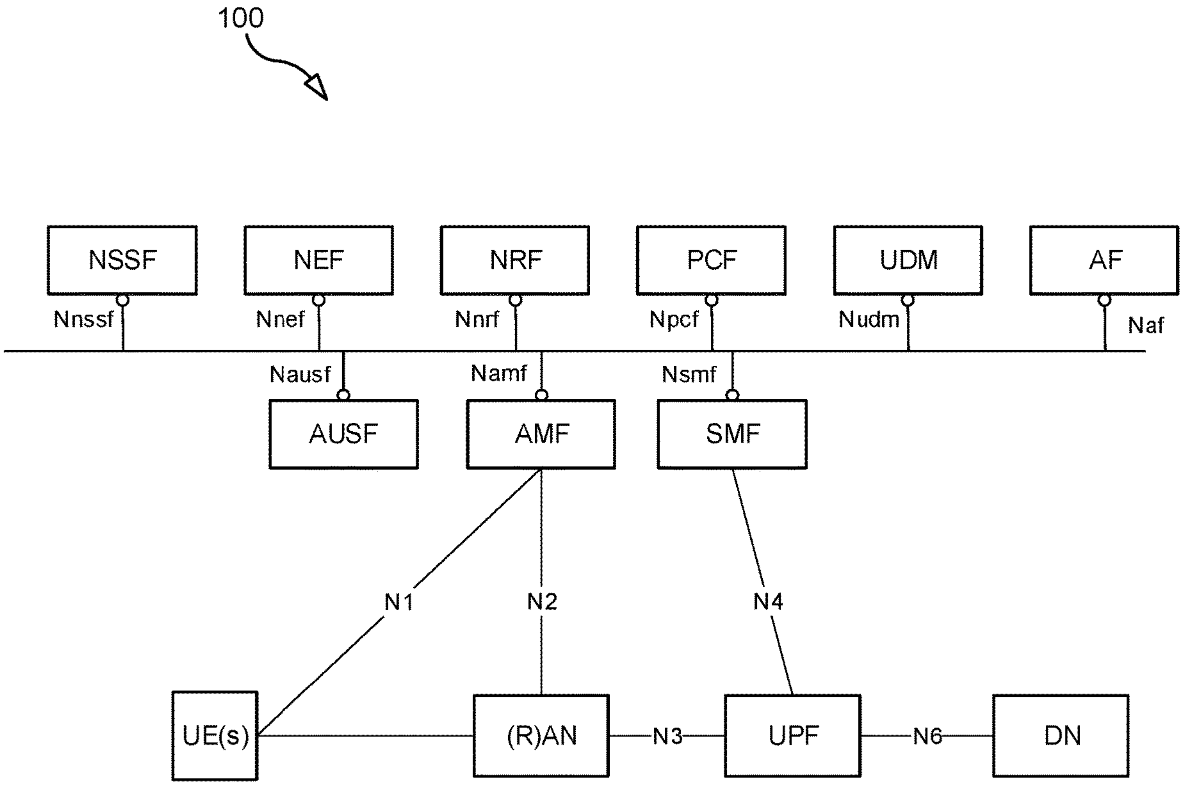
FIG. 1 illustrates a network architecture that may be used according to embodiments.

In some examples, one or more of the following definitions may be used:

- 5G-LAN group: a set of UEs using private communication for 5G LAN-type service.
- 5G LAN-type service: a service over the 5G system offering private communication using IP and/or non-IP type communications.
- 5G LAN-virtual network: a virtual network capable of supporting 5G LAN-type service.
- 5G-LAN one to one communication: communication between two UEs in a 5G-LAN group.
- 5G-LAN one to many communication: communication between one UE and many UEs in a 5G-LAN group.

Certain challenges exist with respect to the current specifications for 5G. For example, there is a lack of procedure details for when different routing policies (e.g., N6-based, Local Switched, and Nx-Based) are to be used. In certain aspects, there is a need for improved routing of traffic between two UEs of a 5G-LAN group such that locally switched and/or Nx-Based policies may be implemented without the need to route traffic over an external data network (DN), e.g., utilizing N6.

According to embodiments, Nx-based forwarding may require that UL/DL traffic is switched in the UPF between a N4 session for a PDU Session (belonging to a 5G-LAN group member) and a shared tunnel (Nx) between two UPFs. If there are associated QoS, usage reporting, etc. requirements on this shared tunnel, e.g. to enforce all packets on a tunnel to a certain bit rate or to count the volume on the shared tunnel, an N4 session (PFCP session) for the shared tunnel, in addition to the N4 sessions for the PDU Sessions, can be used. This could allow specific QER(s) and URR(s) associated with the shared tunnel to be implemented. The SMF can instruct the UPF to forward traffic between two N4 sessions within the UPF.

According to embodiments, local switching in a UPF is provided. In some instances, local switch forwarding in the UPF may require that UL/DL traffic is switched in the UPF between an N4 session for a PDU Session (belonging to a 5G-LAN group member) and another N4 session (belonging to another 5G-LAN group member). To perform a local switch in UPF, the UPF receives an UL packet for one PDU Session and performs the related processing (PDR, QER, URR, FAR) and sends it as a DL transmission on another PDU Session after performing the related processing for that PDU Session (PDR, QER, URR, FAR). The egress for the UL processing can be connected to the ingress of the DL processing. For example, a FAR for the UL PDU can inform the UPF that the PDU requires further ingress processing (e.g., the FAR instructs the UPF to send the PDU back to its routing engine so that the UPF can match the PDU to another PDR).

According one embodiment, a new value for "Source Interface" and "Destination Interface" is provided to denote a UPF-internal interface. For instance, a new value of "Internal" or "5G-LAN" or combination ("5G LAN Internal") can be added to inform the UPF that the PDU requires further ingress processing. Current acceptable values for the Source Interface and Destination Interface information elements include: Access (0), Core (1), SGi-LAN/N6-LAN (2), CP-Function (3), and LI Function (4). See 3GPP TS 29.244 v. 15.4.0 (hereafter "TS 29.44"). The values 5 to 15 are currently not being used. Hence the new value (e.g., named 5G LAN Internal) can be an integer value greater than 4 and less than 16. In this embodiment, the Network Instance information element (IE) (see section 8.2.4 of TS 29.44) may be used to ensure traffic separation between different 5G-LAN groups, to ensure that traffic from one 5G-LAN group does not get mixed with traffic for another 5G-LAN group or for non-5G-LAN group related traffic. The Network Instance value could, for example, be set to a value identifying a particular 5G-LAN group (e.g., 5G_LAN_Group_01, 5G_LAN_Group_02, 5G_LAN_Group_03, . . . , or 5G_LAN_Group_01_Nx, 5G_LAN_Group_02 Nx,).

According to another embodiment, several new values for "Source Interface" and "Destination Interface" is provided to denote a UPF-internal interface. These multiple new source/destination interface may be named "5G_LAN_Group01" (used for local switch when both communication parties (UEs) are served by the same UPF) and "5G_LAN_Group01_Nx (used when both communication parties (UEs) are served by the different UPFs), "5G LAN_Group02" and "5G_LAN_Group02_Nx", ""5G_LAN_Group03" and "5G LAN_Group03 Nx", for different 5G LAN group 01, 02 and 03.

According to embodiments, to explicitly associate two N4 sessions for the local switch, the PDU is not sent back for another round of ingress processing, i.e. classification based on active PDRs to identify the N4 session and matching PDR, as this could be inefficient in some scenarios since the SMF knows already based on destination address what the target N4 Session is. Rather, and in order to instruct the UPF about the target N4 Session and to avoid inefficiencies, a UPF can determine target N4 Session based on packet inspection, the new value for Source/Destination Interface could be used together with a new parameter in the FAR that indicates target N4 sessions. For example, the FAR could contain the N4 session ID (SEID) corresponding to the PDU Session where the DL traffic is to be forwarded. The UPF would then, based on the FAR for UL traffic, explicitly know which N4 session to apply and would not have to again determine the N4 session based on the PDR for DL traffic. This could improve efficiency in the UPF.

Figure 2A:
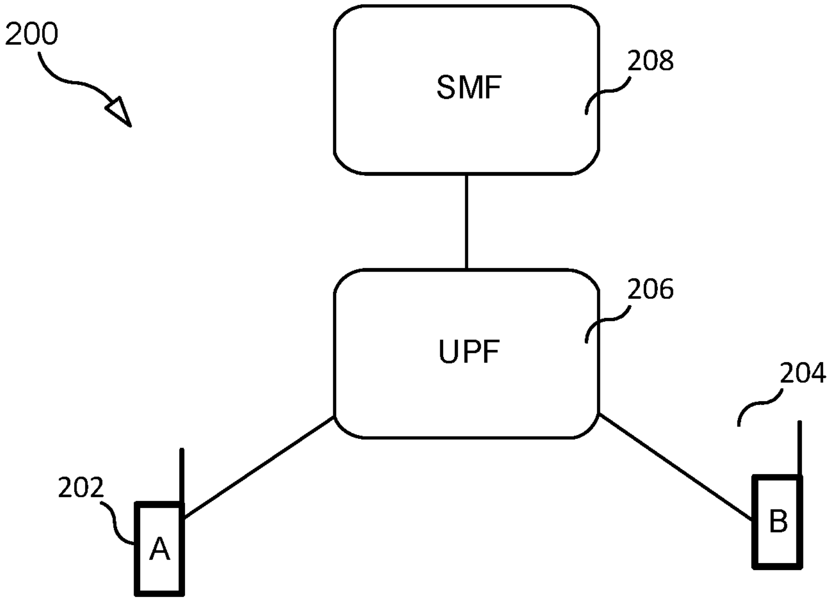
FIG. 2A illustrates a scenario where two UEs belonging to the same LAN group are served by the same UPF.
Figure 2B:
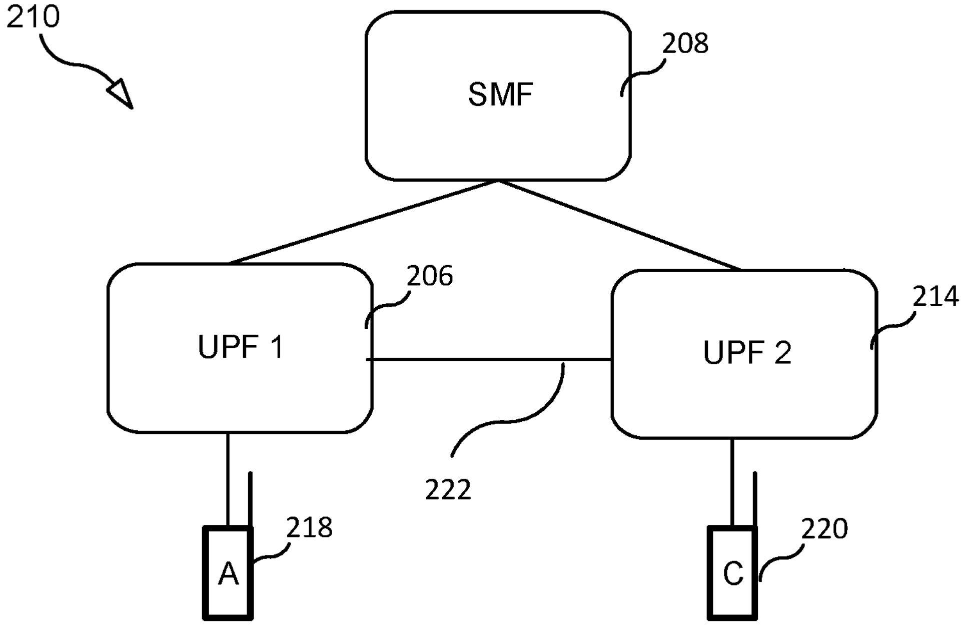
FIG. 2B illustrates a scenario where two UEs belonging to the same LAN group are served by different UPFs.

FIGS. 2A and 2B illustrate first and second use cases according to embodiments. The use case of FIG. 2A can be considered a local switch, while the use case of FIG. 2B can be understood as an example of Nx-based forwarding.

Referring now to FIG. 2A, a system 200 is illustrated with a single UPF 206 controlled by an SMF 208, for example, via an N4 session between the functions. The UPF node 206 serves UE-A 202 and UE-B 204. The PDUs transmitted by the UEs may be received by a RAN node (e.g., gNB) (not shown in FIG. 2A) and then forwarded by the RAN node to UPF 206. According to embodiments, there is an N3 session established for each of the UEs 202, 204 with UPF 206 via a RAN. Sessions may be defined and controlled by SMF 208. There is also an N4 session for each of the UEs 202, 204.

According to embodiments, the SMF 208 configures UPF 206 using PFCP signaling. In certain aspects, the SMF 208 can provide the UPF with both a set of Packet Detection Rules (PDRs) and Forwarding Action Rules (FARs), which define how traffic from UEs 202, 204 is handled. In this example, the UPF is able to forward traffic from one UE to another UE (e.g., from UE-A 202 to UE-B 204) for the case when both UEs are served by the same UPF ("local Switch") and are part of a 5G-LAN group.

In this arrangement, UPF 206 can forward the traffic without the use of a DN, for instance, without N6. However, because UPF 206 has one or more PDRs/FARs for both UEs, it can still apply the necessary rules without using the DN. For instance, for a communication from UE-A 202 to UE-B 204, UPF 206 may apply the appropriate PDR/FAR to: (1) recognize the traffic as intended for another UE served by the same UPF/group; (2) apply the appropriate actions (e.g., QoS, counting and/or charging); and (3) forward the traffic to the second UE-B 204. According to embodiments, forwarding to the second UE-B 204 comprises applying the appropriate, PDR/FAR for that UE, including for instance appropriate QoS, counting and/or charging. In this respect, all rules are applied as if a DN over N6 were used, without the need for the DN. This is further illustrated in FIG. 3A.

Referring now to FIG. 2B, a system 210 is illustrated with two UPFs—UPF1 206 and UPF2 214—which are both controlled by an SMF 208, for example, via respective N4 sessions between the functions. As in the example of FIG. 2A, the UPFs 206, 214 handle communications between the respective UEs 218 and 220. According to embodiments, there is an tunnel connection 222 between the UPFs 206, 214 (e.g., an Nx tunnel).

According to some embodiments, the SMF 208 can instruct two or more UPFs, e.g. UPFs 206, 214 using PFCP signaling such that the UPFs are able to forward the traffic from one UE to another on the same LAN without use of an external DN, e.g., via N6. This could include from UE 218 to UE 220 even though the UEs are served by different UPFs. The tunnel connection 222 may be used for such "Nx-based forwarding." In this example, when UPF1 206 has user plane traffic from UE 218 with a destination towards another UE (e.g., UE 220) in the uplink direction, UPF1 206 is instructed to forward the traffic to the second UPF2 214, which is instructed to send the traffic in the downlink direction to destination UE pertaining to the same 5G-LAN group. This is further illustrated in FIG. 3B. Though not illustrated, in some instances, there may be one or more intermediate UPFs between the first and second UPFs.

In certain aspects, the SMF 208 provides each of the UPFs 206, 214 with both a set of Packet Detection Rules (PDRs) and Forwarding Action Rules (FARs), which define how traffic from the respective UEs 218,220 is handled. In this example, the first UPF is able to forward traffic from the first UE to the second UE (e.g., from UE-A 218 to UE-B 220) using a tunnel connection 222 to the second UPF. In this arrangement, the UPFs can route the traffic without the use of an external network DN, for instance, without N6. However, because the UPFs have the necessary PDR/FAR for the respective UEs, the appropriate rules are still applied. For instance, for a communication from UE-A 218 to UE-B 220, UPF 206 may apply the appropriate PDR/FAR to: (1) recognize the traffic as intended for another UE within the same group on a different UPF; (2) apply the appropriate actions (e.g., QoS, counting and/or charging); and (3) forward the traffic to the second UPF via a tunnel connection. According to embodiments, the second UPF (e.g., UPF2 214) applies the appropriate PDRs/FARs such that all appropriate actions are applied to the traffic. In this respect, all rules are applied as if a DN were used, without the need for the DN.

According to embodiments, a new forwarding table is created for a new destination interface. An indicator of destination may be called, for example, "5G-LAN_GROUP" or "Internal." Such an indicator may allow a UPF faster lookup in the forwarding table for "5G-LAN." Additionally, and in some embodiments, the UPF is informed that the PFCP Session is applicable for a 5G-LAN communication, so that UE's address should be added into the forwarding table for "5G-LAN" at PFCP Session Establishment for a given PDU session. This could be used to enable one or more of a local switch (as in FIG. 2A) and Nx-based forwarding (as in FIG. 2B).

According to embodiments, a control plane function, e.g. the SMF, controls one or more UPFs. In certain aspects, the SMF may provision a UL PDR/FAR to send UE-to-UE traffic to "5G-LAN." An uplink (UL) PDR may be provisioned to identify UE-to-UE traffic from the originating UE, either via a Service Data Flow (SDF) filter where the destination IP address is another UE's address, e.g. a range of destination IP addresses (for the addresses range reserved for the group), or an ethernet packet filter when destination MAC address is another UE's MAC address, or a pre-configured application ID. This PDR will thus detect packets from originating UE that are destined to a specific target UE. An UL Forwarding Action Rule (FAR) can be provisioned to forward the traffic into "5G-LAN Internal". In certain aspects, this FAR will instruct the UPF to make direct forwarding (e.g., "local switch" or "Nx based forwarding") depending on the details in the FAR.

Additionally, the control plane (e.g., SMF) may also provision a DL PDR/FAR to receive UE-to-UE traffic from "5G-LAN." According to embodiments, a DL PDR is provided to receive the traffic from "5G-LAN." In some embodiments, this PDR is the same as the one for forwarding DL traffic from SGi or N6. Also, a DL FAR may be provisioned to forward the UE-UE traffic to the destination UE.

The PDR/FAR for a given UE and session at the UPF may be updated to accommodate traffic within a 5G-LAN. According to embodiments, this may be accomplished by a "push" or "pull" type arrangement between the UPF(s) and the SMF. For instance, when a new UE joins a 5G-LAN group, update PDR/FARs may be pushed to the respective UPF(s) for subsequent handling of messaging to/from such a UE. In other instances, the UPF(s) may obtain updated (or first) PDR/FARs for communications to/from a particular UE as needed upon recognition.

As discussed above, when the UPF receives a packet transmitted by a first UE that is destined for a second UE on the same 5G-LAN as the first UE, the UPF will identify a first N4 session and match the packet to a first PDR within the first N4 session. This first PDR points to a first FAR for the packet and the first FAR indicates that the packet requires further ingress processing, thereby causing the UPF to look for a second PDR that matches the packet (e.g., the UPF will identify a second N4 session corresponding to the packet and then look for a PDR within the second N4 session that matches the packet). In some instances, a default PDR within the second N4 session may be defined with least precedence value to catch any unknown traffic. That is, when the UPF looks for the second PDR, it may find that the default PDR is the matching PDR. In some embodiments, this default PDR points to a FAR that instructs the UPF to forward the packet the SMF. In other embodiments, the default PDR points to a URR with a new reporting trigger, for instance called "5G-LAN traffic," that instructs the UPF to send to the SMF a PFCP Session Report Request message comprising at least a portion of the packet (e.g., at least the destination network address included in a network layer header of the packet).

Upon receiving the packet or Report Request message, the SMF can determine which UPF is serving the destination UE, and provision the relevant PDR/FAR to the first UPF, and any intermediate UPFs (for potential communication from a UE served by the UPF to the same destination UE), to enable it forward the traffic to that UPF.

Figure 3A:
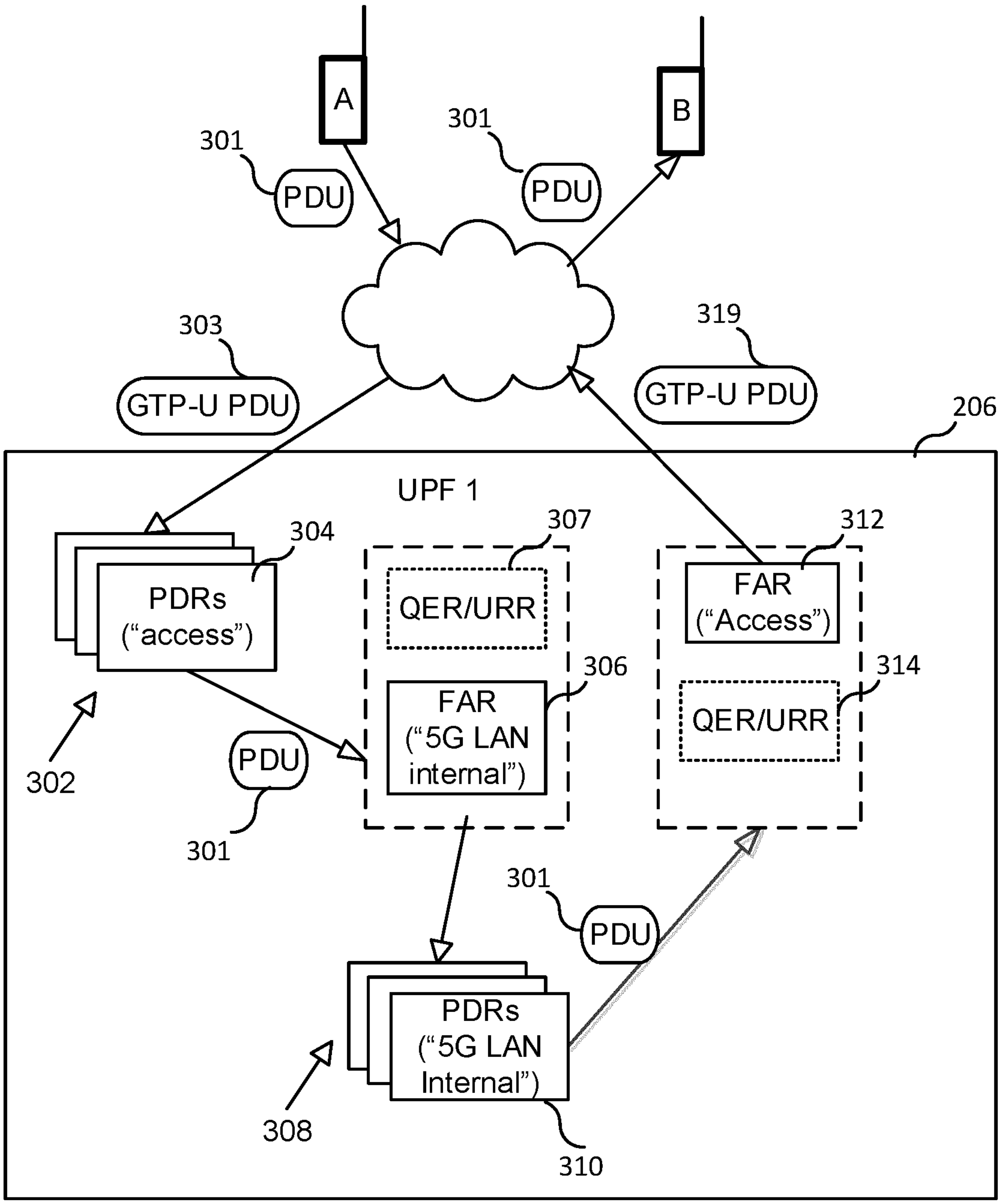
FIG. 3A illustrates a scenario where two UEs belonging to same LAN group are served by the same UPF.

FIG. 3A further illustrates an example embodiment. In the example shown in FIG. 3A, UE A transmits a PDU 301 (e.g., an IP packet) that is received at a RAN 300. The RAN 300 (e.g., a base station within the RAN) adds a GTP-U header to PDU 301, thereby generating a GTP-U PDU 303 that contains the GTP-U header and PDU 301 transmitted by UE A. The RAN 300 then transmits the GTP-U PDU 303 to UPF 206 and UPF 206 receives the transmission (i.e., the GTP-U PDU). PDU 301 includes the address of UE B as the destination address of PDU 301 (i.e., PDU 301 is destined for UE B). UPF 206 then uses information included in the GTP-U PDU 303 to find a first PDR 304 matching information included in the GTP-U PDU 303 (e.g. a source address and a destination address of the PDU transmitted by UE A).

In some embodiments, the step of using information included in the GTP-U PDU 303 to find the first PDR 304 comprises using information included in the GTP-U PDU 303, e.g., a local Tunnel Endpoint Identifier (TEID) identifying a tunnel endpoint at a receiving entity and allocated earlier for the PDU session of the UE A (to receive GTP-U PDU from a access network) to identify a first N4 session (e.g., an N4 session corresponding to PDU 301 transmitted by the first UE) prior to finding the first PDR 304. The UPF 206 finds the first PDR by searching the set of PDRs 302 within the first N4 session for the first matching PDR 304 (e.g., the UPF searches the set of one or more PDRs 302 in precedence order until it finds a PDR having PDI matching the PDU transmitted by UE A).

The first PDR 304 identifies a first FAR 306 (i.e., the first PDR 304 includes a FAR ID that identifies the first FAR 306). The first PDR 304 may also identify one or more QoS enforcement rules (QERs) and/or one or more usage reporting rules (URRs) 307, and the UPF will apply the QER(s) and/or the URR(s) with respect to PDU 301.

The first FAR 306 includes an indication (e.g., Destination Interface set to "5G-LAN internal") indicating that PDU 301 requires further ingress processing (i.e., indicating that another PDR matching process is needed for PDU 301). The UPF 206 then enforces the first FAR 306. For example, in some embodiments, enforcing the first FAR 306 includes UPF 206 sending the PDU to the UPF's routing engine using the network instance identifier and the 5G LAN Internal interface as included in the FAR, so that the routing engine can perform the another PDR matching process to find a second PDR 310 for the PDU 301 (second PDR 310 may include a Source Interface IE set to "5G-LAN Internal"). As explained above, in one embodiment, the first FAR 306 includes a network instance IE that includes a network instance identifier that identifies a particular LAN group.

For example, the routing engine upon again processing PDU 301 identifies a second N4 session for PDU 301 and then searches a set of PDRs 308 within the second N4 session for the second matching PDR 310 (e.g., the UPF searches the set of one or more PDRs 308 in precedence order until it finds a PDR having PDI matching PDU 301). The second matching PDR 310 points to a second FAR 312. The second PDR 310 may also identify one or more QoS enforcement rules (QERs) and/or one or more usage reporting rules (URRs) 314, and the UPF will apply the QER(s) and/or the URR(s) 314 with respect to PDU 301.

The UPF 206 then enforces the second FAR 312, wherein enforcing the second FAR comprises UPF 206 using information included in the second FAR (e.g., the value of the second FAR's Destination Interface IE) to forward the PDU to the UE B. In this example, the value of the second FAR's Destination Interface IE is set to Access. In this respect, the same rules are applied to PDU 301 as if the PDU for UE B had been received via an N6 interface (i.e., from a data network (DN)). Before UPF 206 forwards PDU 301 to UE B, UPF 206 adds a header to PDU 301 based on outer header creation information included in the second FAR 312, thereby generating a second GTP-U PDU 319 that consists of the outer header and PDU 301. That is, UPF 206 forwards PDU 301 to UE B by transmitting GTP-U PDU 319 to RAN 300, which will then transmit PDU 301 to UE B.

Figure 3B:
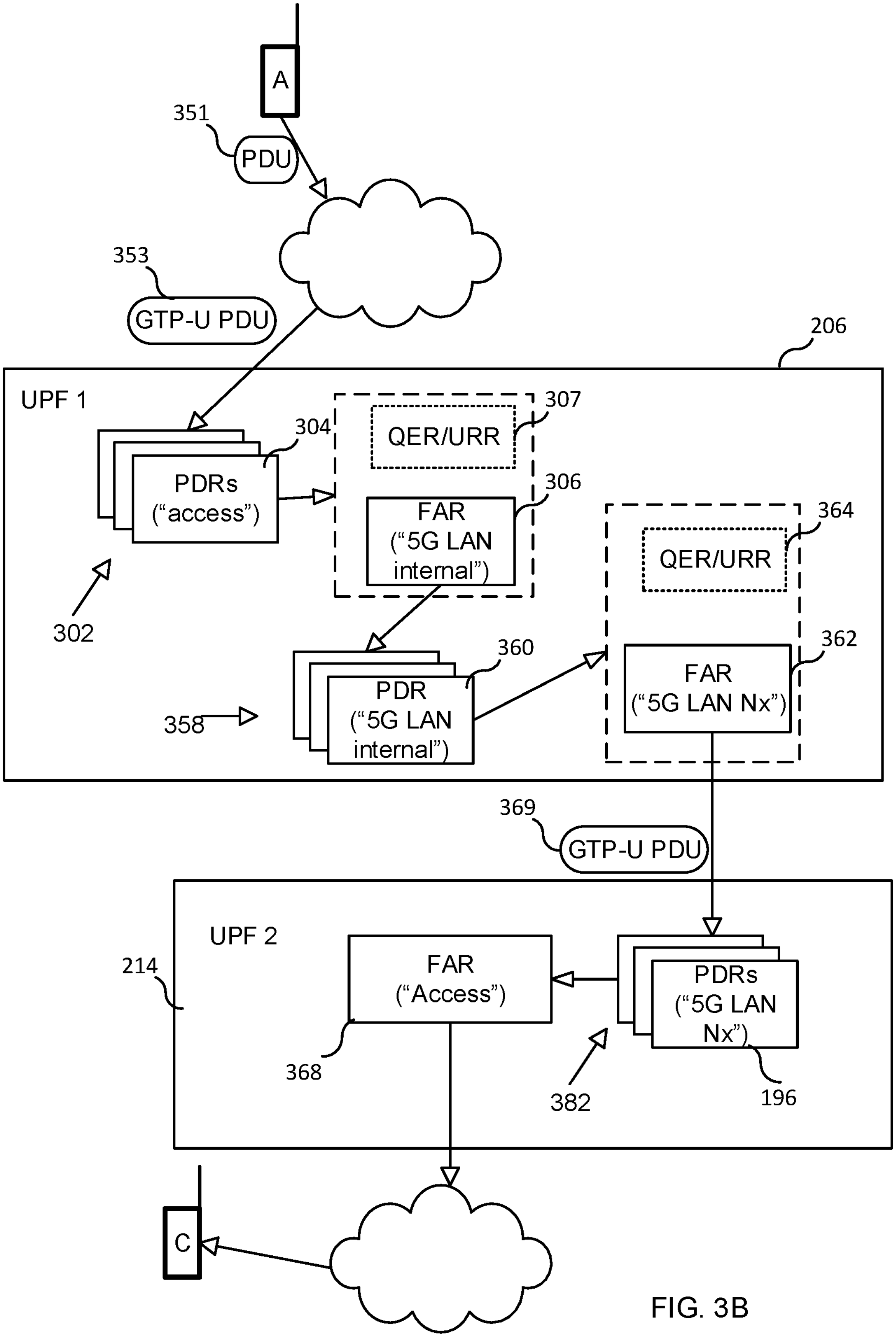
FIG. 3B illustrates a scenario where two UEs belonging to same LAN group are served by different UPFs.

FIG. 3B illustrates another example embodiment. In the example shown in FIG. 3A, UE A transmits a PDU 351 (e.g., an IP packet) that is received at a RAN 300. The RAN 300 adds a GTP-U header to the PDU 351, thereby generating a GTP-U PDU 353 that contains the GTP-U header and PDU 351. The RAN 300 then transmits the GTP-U PDU 353 to UPF 206 and UPF 206 receives the transmission (i.e., the GTP-U PDU). The PDU 351 includes the address of UE C as the destination address of PDU 351 (i.e., PDU 351 is destined for UE C). UPF 206 then uses information included in the GTP-U PDU 353 to find a first PDR matching information included in the GTP-U PDU 353 (e.g. a source address and a destination address of the PDU transmitted by UE A). In this example, the matching PDR is PDR 304.

As described above, the first PDR 304 identifies FAR 306 and may also identify one or more QoS enforcement rules (QERs) and/or one or more usage reporting rules (URRs) 307, and the UPF will apply the QER(s) and/or the URR(s) with respect to PDU 351.

As also described above, the first FAR 306 includes an indication indicating that the PDU 351 requires further ingress processing (i.e., indicating that another PDR matching process is needed for the PDU 351). The UPF 206 then enforces the first FAR 306. For example, in some embodiments, enforcing the first FAR 306 includes UPF 206 sending the PDU 351 and the network instance identifier included in the FAR to the 5G LAN Internal interface of the UPF's routing engine so that the routing engine can perform another PDR matching process to find a second PDR 360 for the PDU 351 (second PDR 360 may include a Source Interface IE set to "5G-LAN Internal"). As explained above, in one embodiment, the first FAR 306 includes a network instance IE that includes a network instance identifier that identifies a particular LAN group.

For example, the routing engine upon again processing the PDU 351 identifies a second N4 session and then searches a set of PDRs 358 within the second N4 session for the second matching PDR 360 (e.g., the UPF searches the set of one or more PDRs 358 in precedence order until it finds a PDR having PDI matching PDU 351). The second matching PDR 360 points to a second FAR 362. The second PDR 360 may also identify one or more QoS enforcement rules (QERs) and/or one or more usage reporting rules (URRs) 364, and the UPF will apply the QER(s) and/or the URR(s) 364 with respect to PDU 351.

The UPF 206 then enforces the second FAR 362, wherein enforcing the second FAR comprises UPF 206 using information included in the second FAR (e.g., the value of the second FAR's Destination Interface IE) to forward the PDU to the UE C. In this example, the value of the second FAR's Destination Interface IE is set to 5G LAN Nx, therefore, UPF 206 forward PDU 351 to UE C by transmitting PDU 351 to UPF 214. More specifically, before UPF 206 forwards PDU 351 to UE C, UPF 206 adds a header to PDU 351 based on outer header creation information included in the second FAR 360, thereby generating a second GTP-U PDU 369 that consists of the outer header and PDU 351. UPF 206 then forwards PDU 351 to UE C by transmitting GTP-U PDU 369 to UPF 214, which will then transmit PDU 351 to UE C via RAN 390.

More specifically, UPF 214, upon receiving GTP-U PDU 369, UPF 214 uses information included in the GTP-U PDU 369 to find a PDR 196 matching information included in the GTP-U PDU 369 (e.g. a source address and a destination address of the PDU transmitted by UE A). In some embodiments, the step of using information included in the GTP-U PDU 369 to find PDR 196 comprises using information included in the GTP-U PDU 369, e.g., a local TEID, to identify a first N4 session (e.g., the N4 session corresponding to a 5G LAN group to which UE A and UE C belong) prior to finding the first PDR 196. The UPF 214 finds PDR 196 by searching the set of PDRs 382 within the identified N4 session (e.g., the UPF 214 searches the set of one or more PDRs 382 in precedence order until it finds a PDR 196 having PDI matching PDU 351).

Figure 4:
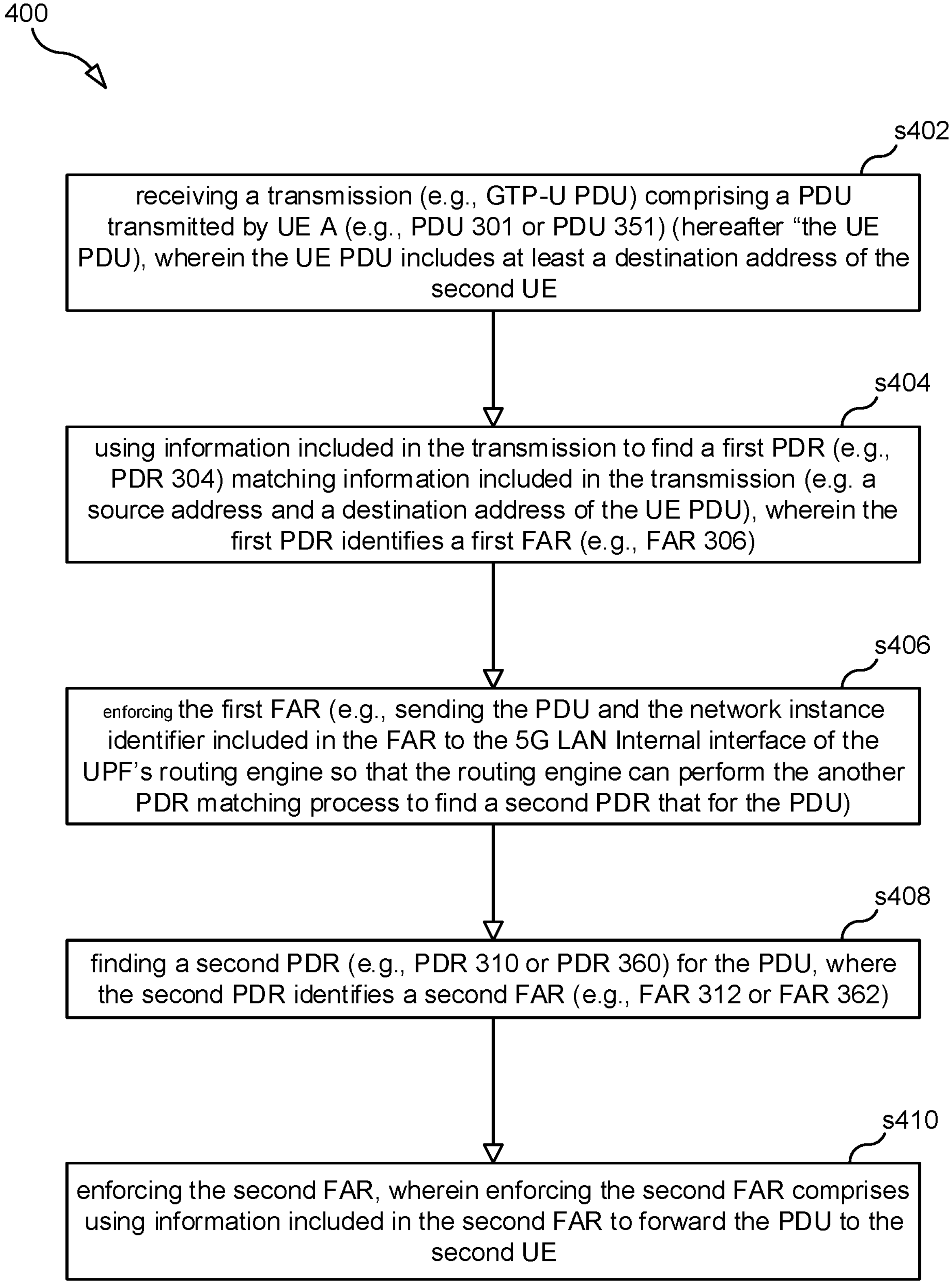

FIG. 4 is a flow chart illustrating a process 400, according to one embodiment, for supporting communication between a first UE, such as UE 202 (a.k.a., UE A) and a second UE, such as UE 204 (a.k.a., UE C) or UE 220 (a.k.a., UE C), camping on a local area network, LAN (e.g., a 5G LAN). Process 400 is performed by UPF 206. Process 400 may begin in step s402.

Step s402 comprises UPF 206 receiving a transmission (e.g., GTP-U PDU 303 transmitted by a access network node or a PDU transmitted by another UPF over an Nx interface) comprising a PDU transmitted by UE A (e.g., PDU 301 or PDU 351) (hereafter "the UE PDU), wherein the UE PDU includes at least a destination address of the second UE. In some embodiments, the transmission comprises an outer header (e.g., GTP-U header) to which PDU 301 is appended.

Steps s404 comprises UPF 206 using information included in the transmission to find a first PDR (e.g., PDR 304) matching information included in the transmission (e.g. a source address and a destination address of the UE PDU), wherein the first PDR identifies a first FAR (e.g., FAR 306). In some embodiments, the step of using information included in the transmission to find the first PDR comprises UPF 206 using information included in the transmission (e.g., a local TEID allocated earlier for the PDU session of the UE A (to receive GTP-U PDU from a access network) or a local TEID allocated earlier for an N4 session created for a specific 5G LAN group (to receive GTP-U PDU from the first UPF)) to identify a first N4 session (e.g., an N4 session corresponding to the 5G LAN group or an N4 session corresponding to the PDU transmitted by the UE A) prior to finding the first PDR, and the first PDR is associated with the identified N4 session. That is, after identifying the N4 session, UPF matches the UE PDU to a PDR that is within the N4 session. In some embodiments, the first PDR includes an instruction to remove the outer header (e.g., the GTP-U header to which the UE PDU is appended).

In some embodiments, the first PDR includes first PDI to enable UPF 206 to identify the PDU as pertaining to a 5G LAN group traffic (e.g., the PDI specifies a source and destination address range, or any other significant bit(s) in the PDU which can be used to identify the application used for the communication within a given 5G LAN group).

The first FAR includes an indication (e.g., Destination Interface set to "5G-LAN internal") indicating that the UE PDU requires further ingress processing (i.e., indicating that another PDR matching process is needed for the PDU).

In some embodiments, the first FAR further includes a Network Instance IE that contains a network instance value identifying a particular 5G LAN group (i.e., a LAN group to which the first UE and the second UE belong).

Step s406 comprises UPF 206 enforcing the first FAR (e.g., sending the PDU and the network instance identifier included in the FAR to the 5G LAN Internal interface of the UPF's routing engine so that the routing engine can perform the another PDR matching process to find a second PDR that for the PDU). In some embodiments, the Destination Interface IE of the first FAR contains an interface value (e.g., a value greater than 4 and less than 16), and the indication indicating that the PDU requires further ingress processing is the interface value of the Destination Interface IE.

Step s408 comprises UPF 206 finding a second PDR (e.g., PDR 310 or PDR 360) for the PDU, where the second PDR identifies a second FAR (e.g., FAR 312 or FAR 362). In some embodiments, the second PDR is found after identifying a second N4 session for the PDU and by matching the PDU with packet detection information, PDI, included in the second PDR. In some embodiments, the second PDR includes second PDI to match the PDU incoming from the source interface, e.g. 5G LAN Internal, and a network domain (e.g., IP domain) specific for the 5G LAN group traffic identified by a Network Instance. In some embodiments, the second PDI includes at least a packet flow description where the destination IP address is set to the IP address belonging to the second UE. In some embodiments, the second N4 session is an N4 session created for a PDU session of the second UE or the second N4 session is an N4 session created for a specific 5G LAN Group which is shared by all UEs pertaining to a same 5G LAN group, to enable communication for UEs when they are served by different UPFs.

Step s410 comprises UPF 206 enforcing the second FAR, wherein enforcing the second FAR comprises using information included in the second FAR to forward the PDU to the second UE.

In some embodiments, UPF 206 serves the second UE and forwarding the PDU to the second UE comprises UPF 206 forwarding the PDU to an access network node (e.g., a 5G-AN node) using a tunnel (e.g., an N3 GTP-U tunnel) established between UPF 206 and the access network node. In such an embodiment, the second FAR includes a Destination Interface IE containing an interface value set to Access (i.e., set to 0).

In some embodiments, forwarding the PDU to the second UE comprises UPF 206 forwarding the PDU to a second UPF (e.g., UPF 214) (which may be the UPF serving the second UE or a UPF between UPF 206 and the UPF serving the second UE) using a tunnel (e.g., an N9 GTP-U tunnel) established between UPF 206 and the second UPF. In such an embodiment, the second FAR may include a Destination Interface IE containing an interface value (e.g., "5G LAN Nx") that indicates that the UPF should forward the PDU to the second UPF using a tunnel established between UPF 206 and the second UPF.

In some embodiments, the second FAR includes a Destination Interface IE containing an interface value (e.g., Core) that indicates that the UPF should forward the PDU to a packet data network over an N6 interface.

In some embodiments, the second FAR further includes a Network Instance IE identifying a network domain (e.g., an IP domain) specific for 5G LAN group traffic.

In some embodiments, the second PDR includes a Source Interface IE containing an interface value that is set to the same value as the interface value of the Destination Interface IE included in the first FAR, and the second PDR includes a Network Instance IE containing an network instance value that is set to the same value as the network instance value of the Network Instance IE included in the first FAR.

In some embodiments, the first PDR comprise a usage reporting rule, URR, identifier identifying a first URR, the second PDR comprise a URR identifier identifying a second URR, and process 400 also includes UPF 206 applying the first URR with respect to the PDU; and UPF 206 applying the second URR with respect to the PDU. In such an embodiment, the first URR may identify a method for measuring a network resource usage, and applying the first URR with respect to the PDU comprises measuring the network resource usage with respect to the PDU.

FIG. 5 is a flow chart illustrating a process 500, according to one embodiment, for supporting communication between a first UE, such as UE 202 (a.k.a., UE A) and a second UE, such as UE 204 (a.k.a., UE C) or UE 220 (a.k.a., UE C), camping on a local area network, LAN (e.g., a 5G LAN). Process 500 is performed by UPF 206. Process 500 may begin in step s502.

Step s502 comprises UPF 206 receiving a transmission (e.g., GTP-U PDU 303 transmitted by a access network node or a PDU transmitted by another UPF over an Nx interface) comprising a PDU transmitted by UE A (e.g., PDU 351) (hereafter "the UE PDU"), wherein the UE PDU includes at least a destination address of the second UE. In some embodiments, the transmission comprises an outer header (e.g., GTP-U header) to which the UE PDU is appended.

Steps s504 comprises UPF 206 using information included in the transmission to find a first PDR (e.g., PDR 304) matching information included in the transmission (e.g. a source address and a destination address of the UE PDU), wherein the first PDR identifies a first FAR (e.g., FAR 306). In some embodiments, the step of using information included in the transmission to find the first PDR comprises UPF 206 using information included in the transmission to identify a first N4 session prior to finding the first PDR. That is, after identifying the N4 session, UPF matches the UE PDU to a PDR that is within the N4 session.

Step s506 comprises UPF 206 obtaining information included in the first FAR. For example, in step s506 UPF 206 reads the value of the Destination Interface (DI) IE included in the FAR. In this example, the value of the DI IE indicates that the UE PDU requires further ingress processing (i.e., indicating that another PDR matching process is needed for the PDU). After obtaining the information, UPF 206 determines, based on the information, that further ingress processing is required for the UE PDU. As a result of determining that that further ingress processing is required for the UE PDU, UPF 206 determines an N4 session for the UE PDU (e.g., UPF 206 determines the N4 session based on information included in the UE PDU).

Thus, step s508 comprises UPF 206, after obtaining the information included the first FAR, identifying the N4 session.

Step s510 comprises UPF 206, after identifying the N4 session, finding a default PDR associated with the N4 session. More specifically, after identifying the N4 session, UPF 206 determines whether the UE PDU matches any of the PDRs within the identified N4 session. A UE PDU matches a PDR when information in the UE PDU (e.g., source address and/or destination address) match the PDI included in the PDR. In this example, the UE PDU only matches the "default" PDR associated with the N4 session (i.e., the PRD within the N4 session that has the lowest precedence).

The default PDR identifies a default FAR and/or a default URR. The default FAR is configured to cause the UPF to transmit the UE PDU to a SMF. The default URR is configured to cause the UPF to transmit to the SMF a PFCP Session Report Request message comprising at least a portion of the PDU (e.g., the destination IP address included in an IP header of the PDU).

In some embodiments, process 500 may further includes UPF 206 transmitting the PDU to the SMF. After transmitting the PDU to the SMF, UPF 206 receives from the SMF a second PDR associated with the N4 session and a second FAR, wherein the second PDR includes a FAR identifier identifying the second FAR.

In some embodiments, process 500 may further includes UPF 206 transmitting the PFCP Session Report Request message to the SMF. After transmitting the PFCP Session Report Request message to the SMF, UPF 206 receives from the SMF a second PDR associated with the second N4 session and a second FAR, wherein the second PDR includes a FAR identifier identifying the second FAR.

Figure 6:
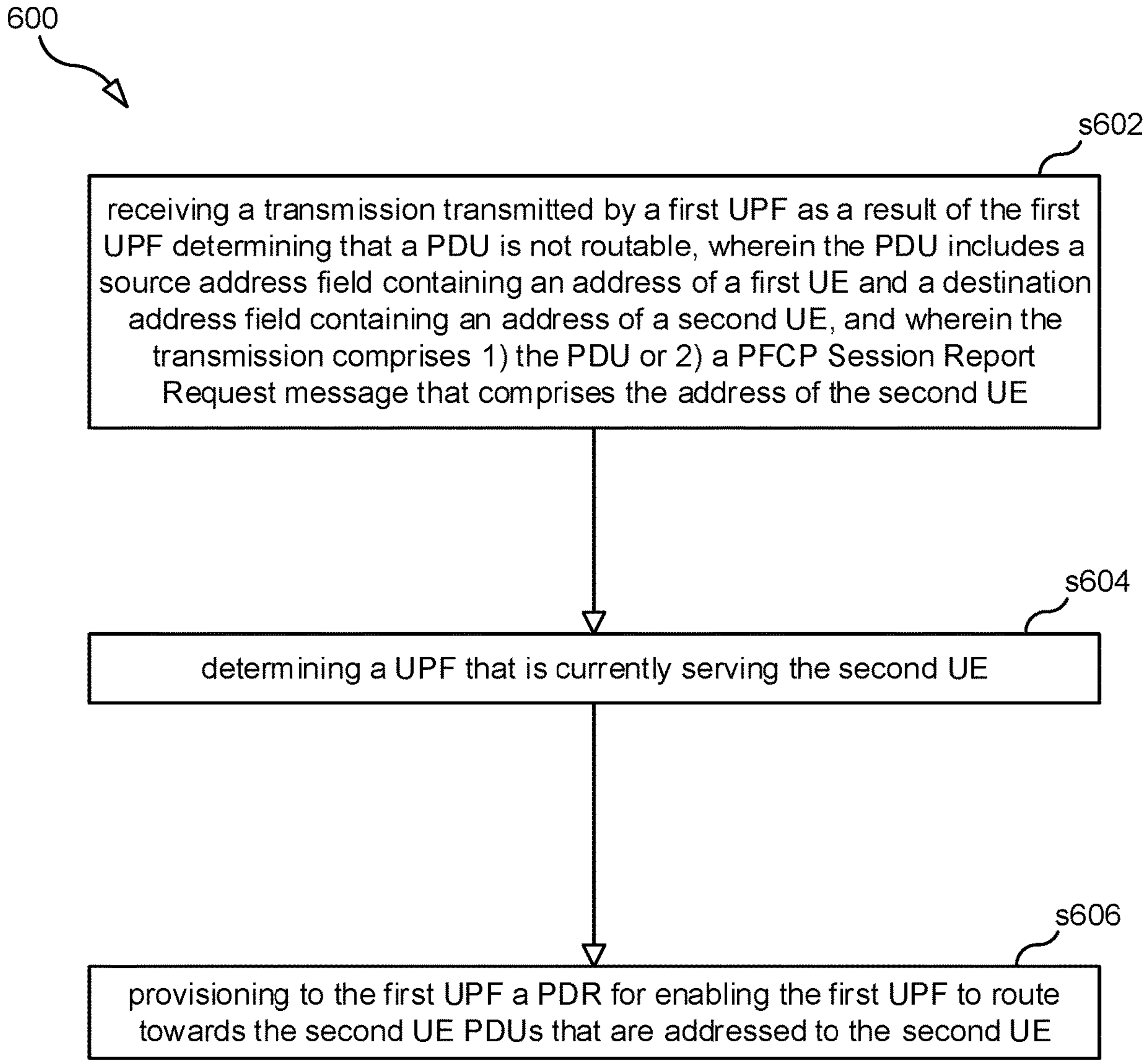

FIG. 6 is a flowchart illustrating a process 600, according to one embodiment, for providing rules to a UPF. Process 600 is performed by an SMF. Process 600 may begin in step s602.

Step s602 comprises the SMF receiving a transmission transmitted by a first UPF as a result of the first UPF determining that a PDU is not routable, wherein the PDU includes a source address field containing an address of a first UE and a destination address field containing an address of a second UE, and wherein the transmission comprises 1) the PDU or 2) a PFCP Session Report Request message that comprises the address of the second UE.

Step s604 comprises the SMF determining a UPF that is currently serving the second UE.

Step s606 comprises the SMF, after determining the UPF that is currently serving the second UE, provisioning to the first UPF a PDR for enabling the first UPF to route towards the second UE PDUs that are addressed to the second UE. In some embodiments, the PDR is in an N4 session specifically created for a 5G LAN group to which the first and second UEs belong.

In some embodiments, process 600 also includes the SMF provisioning to a second UPF a second PDR for enabling the second UPF to route towards the second UE PDUs that are addressed to the second UE and intended for the said 5G LAN group. In some embodiments, the second PDR includes an instruction to remove the outer header of the PDU received from the Source Interface 5G LAN Nx and a network domain specific (e.g. an IP domain) identified by the Network Instance, and the said second PDR is associated with a FAR. In some embodiments, the FAR includes a Destination Interface IE containing an interface value (e.g., "5G LAN Internal") and Network Instance is set to a value specific for the 5G LAN Group that indicates that the second UPF enforcing the FAR, e.g. by sending the PDU to the UPF's routing engine using the network instance identifier and the 5G LAN Internal interface as included in the FAR, so that the routing engine can perform the another PDR matching process to find another PDR in second UEs N4 session that for the PDU).

In some embodiments, the SMF generates the PDR based on the UPF that is currently serving the second UE. For example, if a UPF different than the first UPF is serving the second UE, then the PDR will contain a FAR identifier that identifies a FAR having a Destination Interface IE set to, e.g., 5G LAN Nx, and a Network Instance identifying a network domain (e.g. a IP domain) specific for the 5G LAN group traffic, whereas if the first UPF is serving the second UE, then PDR will contain a FAR identifier that identifies a FAR having a Destination Interface IE set to, e.g., Access.

Figure 7:
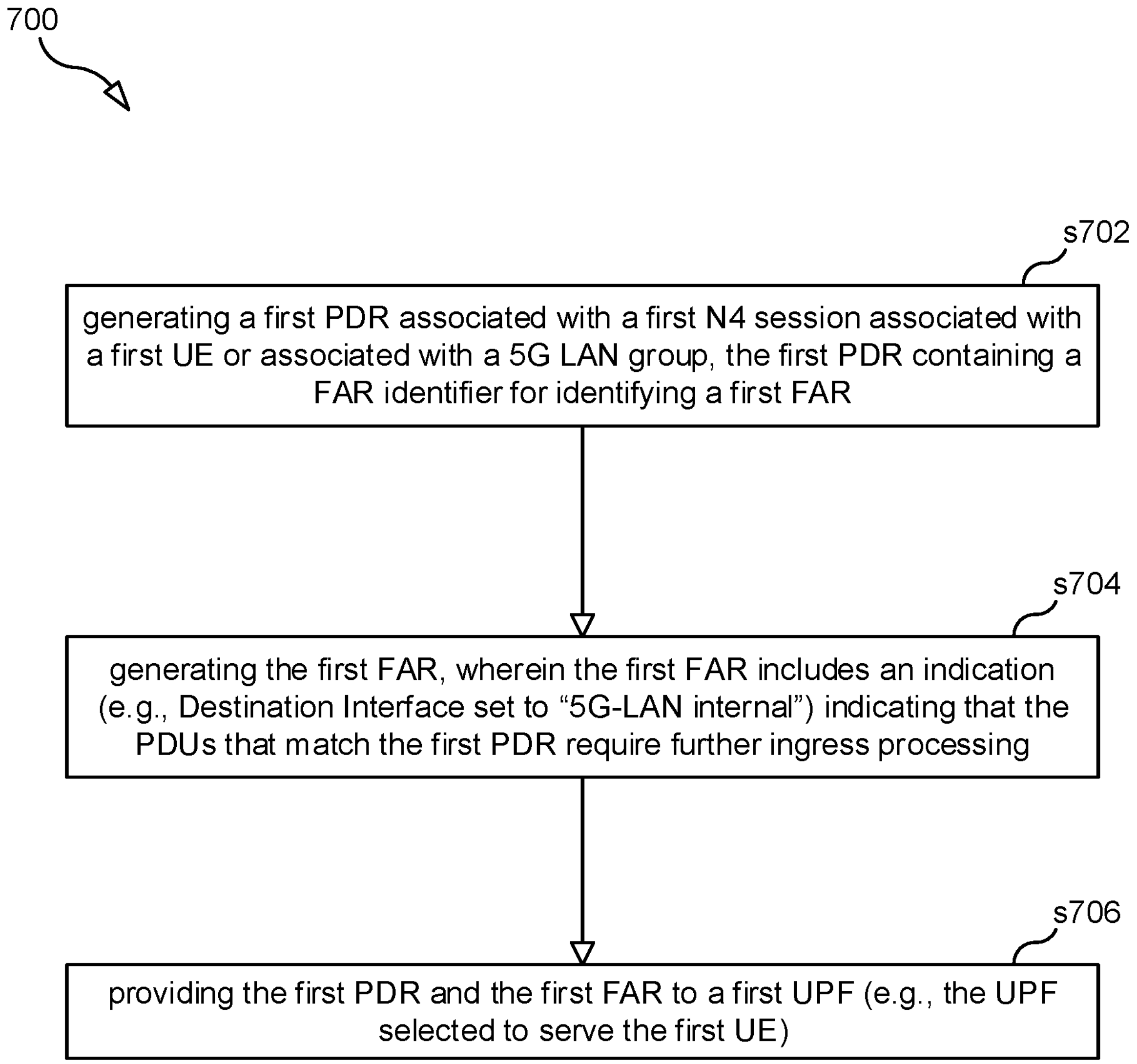

FIG. 7 is a flowchart illustrating a process 700, according to one embodiment, for providing rules to a UPF. Process 700 is performed by an SMF. Process 700 may begin in step s702.

Steps s702 comprises the SMF generating a first PDR associated with a first N4 session associated with a first UE or associated with a 5G LAN group, the first PDR containing a FAR identifier for identifying a first FAR.

Step s704 comprises the SMF generating the first FAR, wherein the first FAR includes an indication (e.g., Destination Interface set to "5G-LAN internal") indicating that the PDUs that match the first PDR require further ingress processing (i.e., indicating that another PDR matching process is needed for the PDUs).

Step s706 comprises the SMF providing the first PDR and the first FAR to a first UPF (e.g., the UPF selected to serve the first UE).

In some embodiments, the SMF provides the first PDR to the first UPF by transmitting to the first UPF a session request (e.g., a session creation request or a session modification request) comprising the first PDR.

In some embodiments process 700 also includes the SMF generating a second PDR associated with a second N4 session, the second PDR containing a FAR identifier for identifying a second FAR; the SMF generating the second FAR; and the SMF providing the second PDR and the second FAR to the first UPF, wherein the Destination Interface IE of the second FAR is set to Core, Access, or 5G LAN Nx (e.g., a value greater than 4 and less than 16). In some embodiments, the second PDR is associated with an N4 session created for a specific 5G LAN group and the Destination Interface IE of the second FAR is set to 5G LAN Nx. In some embodiments, the second PDR is associated with an N4 session associated with a second UE and the Destination Interface IE of the second FAR is set to Access. In some embodiments, the Network Instance IE of the second FAR is set to a value identifying a network domain (e.g. a IP domain) specific for the 5G LAN group traffic.

Figure 8:
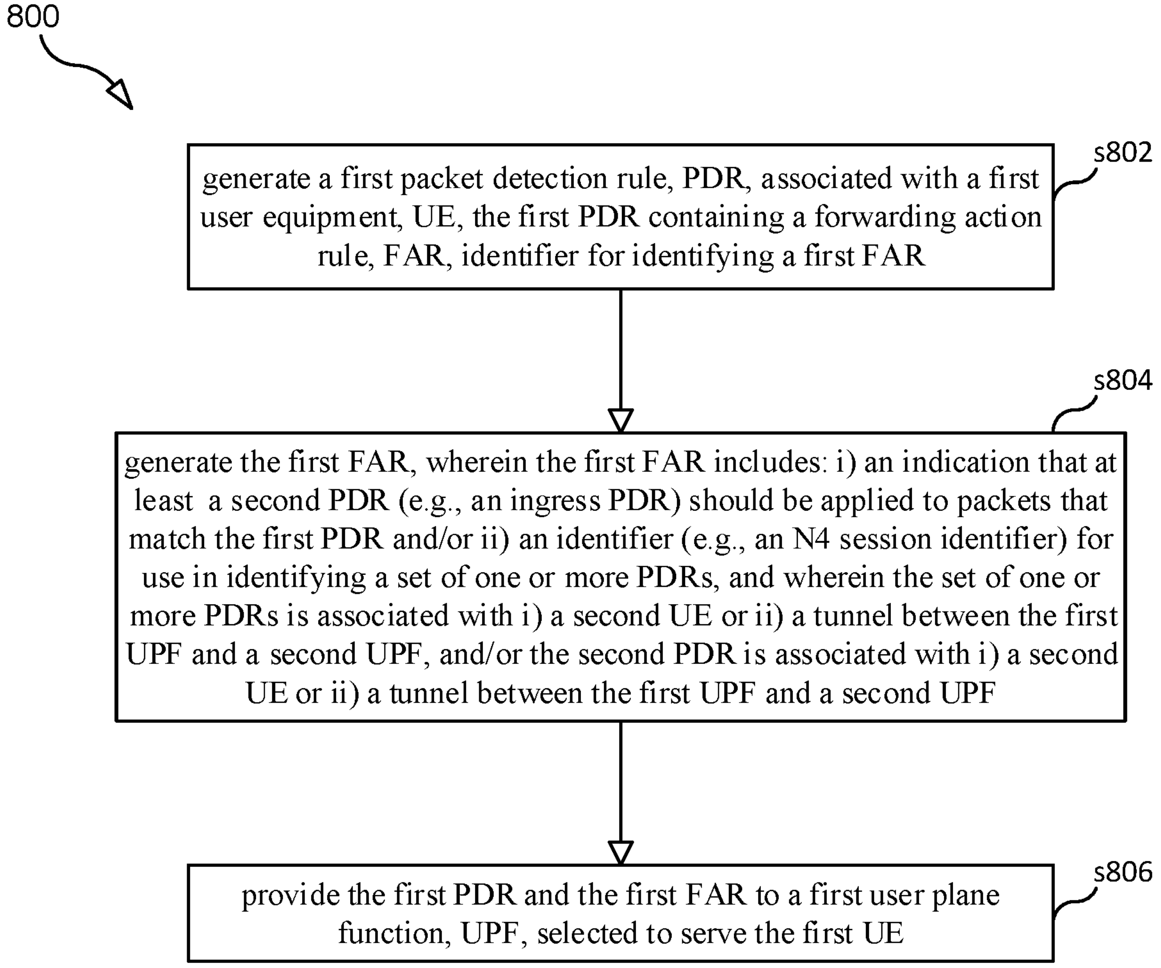

FIG. 8 is a flowchart illustrating a process 800 for supporting a LAN (e.g., a 5G LAN). Process 800 may begin in step s802.

Step s802 comprises generating a first packet detection rule, PDR, associated with a first user equipment, UE, the first PDR containing a forwarding action rule, FAR, identifier for identifying a first FAR.

Step s804 comprises generating the first FAR, wherein the first FAR includes: i) an indication (e.g., "Internal" and/or "5G-LAN") indicating that at least a second PDR (e.g., an ingress PDR) should be applied to packets that match the first PDR (e.g., a packet that matches packet detection information (PDI) included in the first PDR) and/or ii) an identifier (e.g., “internal,” “5G-LAN,” and/or an N4 session identifier) for use in identifying a set of one or more PDRs (e.g., a set of PDRs whose source interface attribute is set to the identifier (e.g., set to “internal” or “5G-LAN”). The set of one or more PDRs is associated with i) a second UE or ii) a tunnel between the first UPF and a second UPF, and/or the second PDR is associated with i) a second UE or ii) a tunnel between the first UPF and a second UPF. The PDI of the first PDR comprises one or more match fields against which packets are matched.

Steps s806 comprises providing the first PDR and the first FAR to a first user plane function, UPF, selected to serve the first UE.

Steps s802-s806, in some embodiments, are performed by an SMF.

In some embodiments, the first FAR includes the identifier, the identifier included in the first FAR is an N4 session identifier identifying an N4 session associated with the second UE, and each PDR included in the set of one or more PDRs contains the N4 session identifier.

In some embodiments, the method is performed by a session management function, SMF, that provides session management functions for both the first UE and the second UE.

In some embodiments, the SMF generates the first PDR and the first FAR after the second UE connects to the LAN.

In some embodiments, the SMF provides the first PDR to the first UPF by transmitting to the first UPF a session modification request comprising the first PDR.

In some embodiments, the process further comprises the SMF receiving a transmission from the first UPF comprising an identifier (e.g., an IP address) associated with the second UE; and determining a UPF that is currently serving the second UE, wherein the SMF generates the first FAR based on the UPF that is currently serving the second UE.

In some embodiments, the UPF serving the second UE is the second UPF and the set of PDRs and/or the second PDR is associated with the tunnel between the first UPF and the second UPF.

In some embodiments, the UPF serving the second UE is the first UPF and the set of PDRs and/or the second PDR is associated with an N4 session identifier associated with the second UE.

In some embodiments, the transmission from the first UPF comprises an uplink (UL) packet transmitted by the first UE, wherein the UL packet comprises an IP address allocated to the second UE.

In some embodiments, the transmission from the first UPF comprises a Session Report Request message.

In some embodiments, the FAR includes a destination interface attribute, and the indication is a destination interface value (e.g., “internal” and/or “5G-LAN”) for the destination interface attribute.

In some embodiments, the second PDR includes an indicator indicating that the second PDR applies to locally switched traffic (e.g., applies to a packet having a source that is on the LAN and having a destination that is on the LAN) and the method further includes providing the second PDR to the first UPF, or the set of PDRs includes a second PDR that includes an indicator indicating that the second PDR applies to locally switched traffic (e.g., applies to a packet having a source that is on the LAN and having a destination that is on the LAN) and the method further includes providing the second PDR to the first UPF.

In some embodiments, the second PDR has a source interface attribute, and an indicator indicating that the second PDR applies to locally switched traffic is a source interface attribute value of the source interface attribute of the second PDR.

Figure 9:
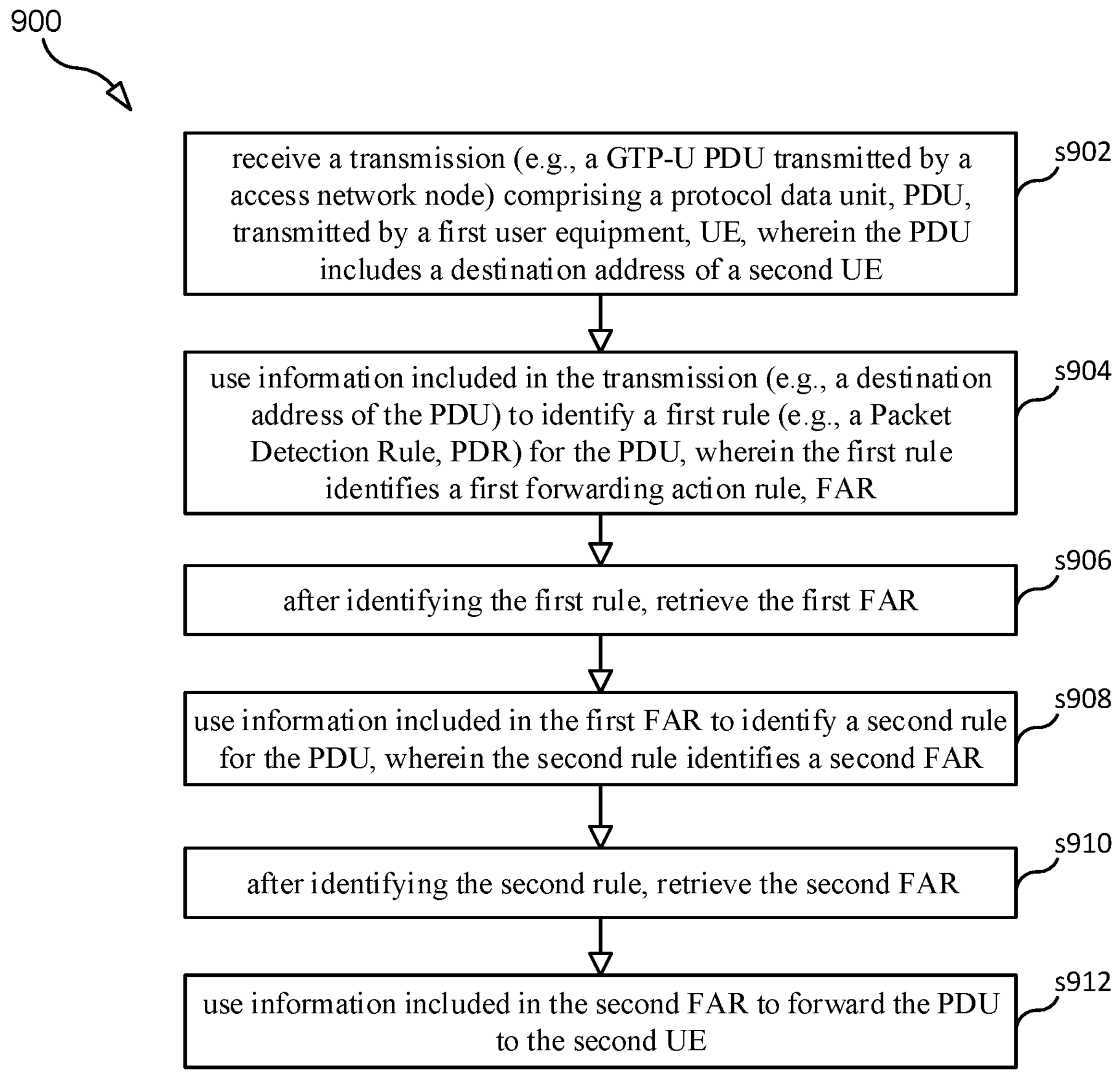

In some embodiments, the first FAR includes: i) the indication that at least a second PDR should be applied to packets that match the first PDR, and ii) the identifier (e.g., an N4 session identifier) for use in identifying a set of one or more PDRs, wherein the set of PDRs includes the second PDR FIG. 9 is a flowchart illustrating a process 900 for supporting a LAN (e.g., a 5G LAN). Process 900 may begin in step s902.

Step s902 comprises a first user plane function, UPF, receiving a transmission (e.g., a GTP-U PDU transmitted by a access network node) comprising a protocol data unit, PDU, transmitted by a first user equipment, UE, wherein the PDU includes a destination address of a second UE.

Step s904 comprises the first user plane function using information included in the transmission (e.g., a destination address of the PDU) to identify a first rule (e.g., a Packet Detection Rule, PDR) for the PDU, wherein the first rule identifies a first forwarding action rule, FAR.

Step s906 comprises after identifying the first rule, the first UPF retrieving the first FAR.

Step s908 comprises the first UPF using information included in the first FAR to identify a second rule for the PDU, wherein the second rule identifies a second FAR.

Step s910 comprises after identifying the second rule, the first UPF retrieving the second FAR.

Step s912 comprises the first UPF using information included in the second FAR to forward the PDU to the second UE.

Steps s902-s912, in some embodiments, are performed by an UPF.

In some embodiments, the first UPF serves the second UE and forwarding the PDU to the second UE comprises the UPF forwarding the PDU to an access network node (e.g., a 5G-AN node) using a tunnel (e.g., an N3 GTP-U tunnel) established between the first UPF and the access network node.

In some embodiments, a second UPF serves the second UE and forwarding the PDU to the second UE comprises the first UPF forwarding the PDU to the second UPF using a tunnel (e.g., an N9 GTP-U tunnel) established between the first UPF and the second UPF.

In some embodiments, forwarding the PDU to the second UE comprises the first UPF forwarding the PDU to a packet data network (e.g., using an N6 interface).

In some embodiments, the first rule comprise a usage reporting rule, URR, identifier identifying a first URR, the second rule comprise a usage reporting rule, URR, identifier identifying a second URR, and the method further comprises: (1) the first UPF applying the first URR with respect to the PDU; and (2) the first UPF applying the second URR with respect to the PDU. According to certain aspects, the first URR identifies a method for measuring a network resource usage, and applying the first URR with respect to the PDU comprises measuring the network resource usage with respect to the PDU.

In some embodiments, the method further comprises the first UPF receiving a transmission transmitted by a UE wherein the transmission comprises a PDU that contains a destination address of a third UE; the first UPF determining that the PDU matches a default PDR containing a FAR identifier that identifiers a third FAR; the first UPF retrieving the third FAR, wherein the third FAR instructs the first UPF to forward the PDU to a session management function; and the first UPF forwarding the PDU to the SMF as instructed by the third FAR.

In some embodiments, the method further comprises the first UPF receiving a transmission transmitted by a UE wherein the transmission comprises a PDU that contains a destination address of a third UE; the first UPF determining that the PDU matches a default PDR containing a rule identifier that identifiers a URR; the first UPF retrieving the URR, wherein the URR instructs the first UPF to send to the SMF a report (e.g., a report containing the destination address of the third UE); and the first UPF sending the report to the SMF as instructed by the URR.

Figure 10:
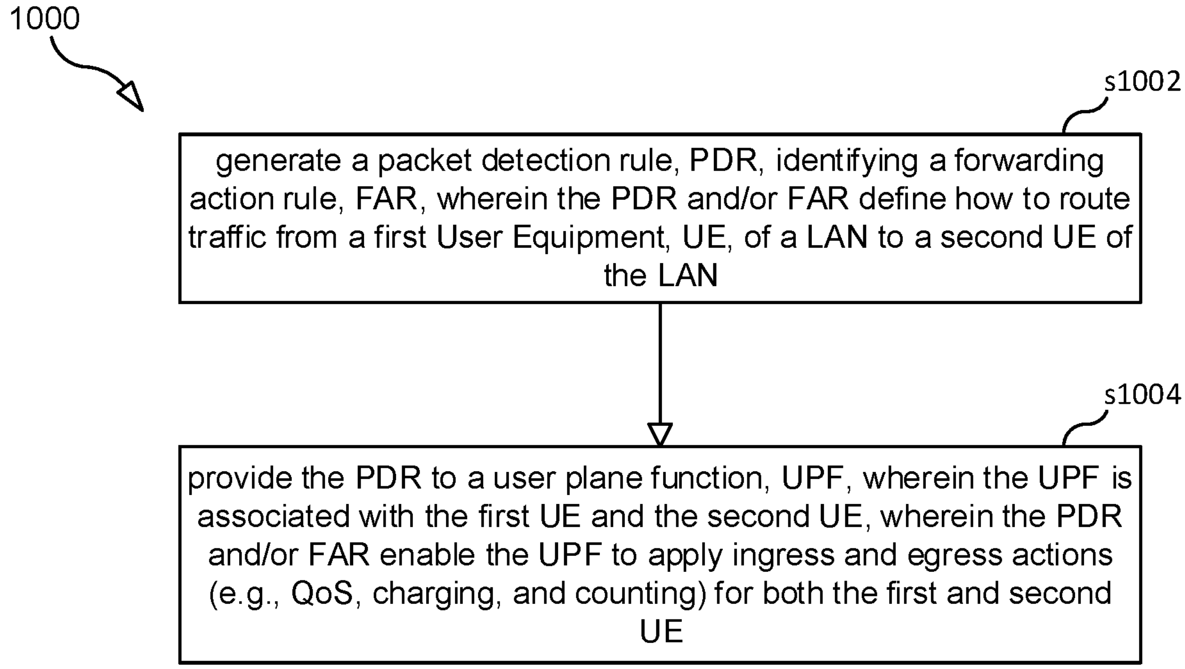

FIG. 10 is a flowchart illustrating a process 1000 for supporting a LAN (e.g., a 5G LAN). Process 1000 may begin in step s1002.

Step s1002 comprises generating a packet detection rule, PDR, identifying a forwarding action rule, FAR, wherein said PDR and/or FAR define how to route traffic from a first User Equipment, UE, of said LAN to a second UE of said LAN.

Step s1004 comprises providing said PDR to a user plane function, UPF, wherein said UPF is associated with said first UE and said second UE, wherein said PDR and/or FAR enable said UPF to apply ingress and egress actions (e.g., QoS, charging, and counting) for both the first and second UE.

Steps s1002 and s1004, in some embodiments, are performed by an SMF.

In some embodiments, said PDR and/or FAR define how to route said traffic from said first UE to said second UE without use of an external Data Network (DN) (e.g., via N6).

Figure 11:
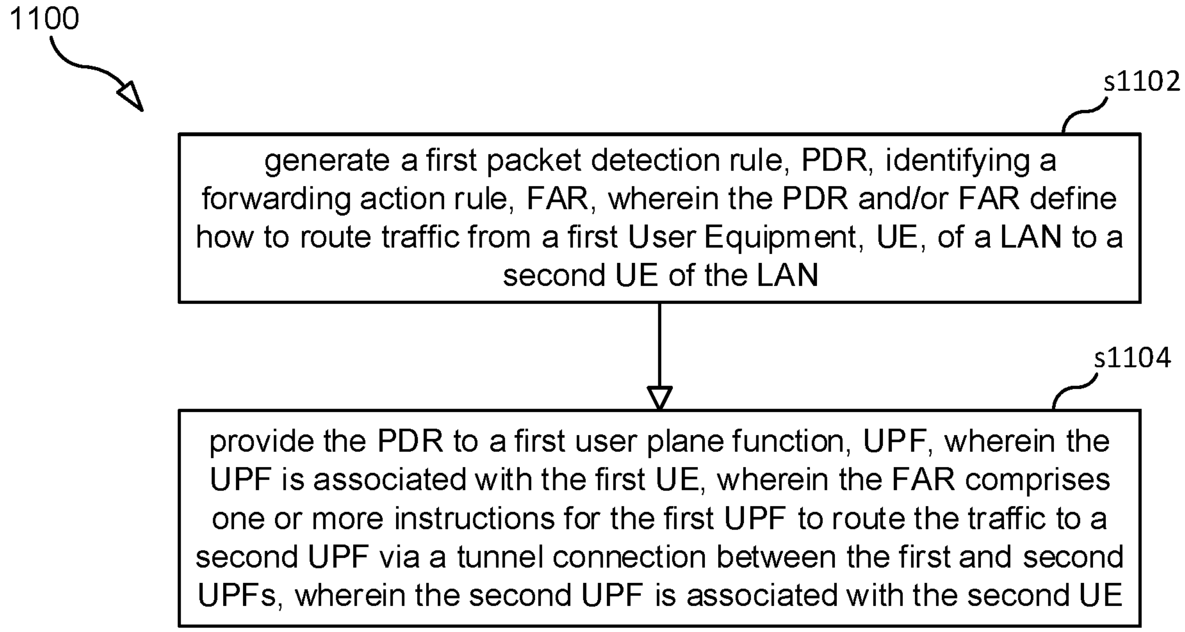

FIG. 11 is a flowchart illustrating a process 1100 for supporting a LAN (e.g., a 5G LAN). Process 1100 may begin in step s1102.

Step s1102 comprises generating a first packet detection rule, PDR, identifying a forwarding action rule, FAR, wherein said PDR and/or FAR define how to route traffic from a first User Equipment, UE, of said LAN to a second UE of said LAN.

Step s1104 comprises providing said PDR to a first user plane function, UPF, wherein said UPF is associated with said first UE, wherein said FAR comprises one or more instructions for said first UPF to route said traffic to a second UPF via a tunnel connection between said first and second UPFs, wherein said second UPF is associated with said second UE.

Steps s1102 and s1104, in some embodiments, are performed by an SMF.

In some embodiments, said PDR and/or FAR define how to route said traffic from a said first UE to said second UE without use of an external Data Network (DN) (e.g., via N6).

Figure 12:
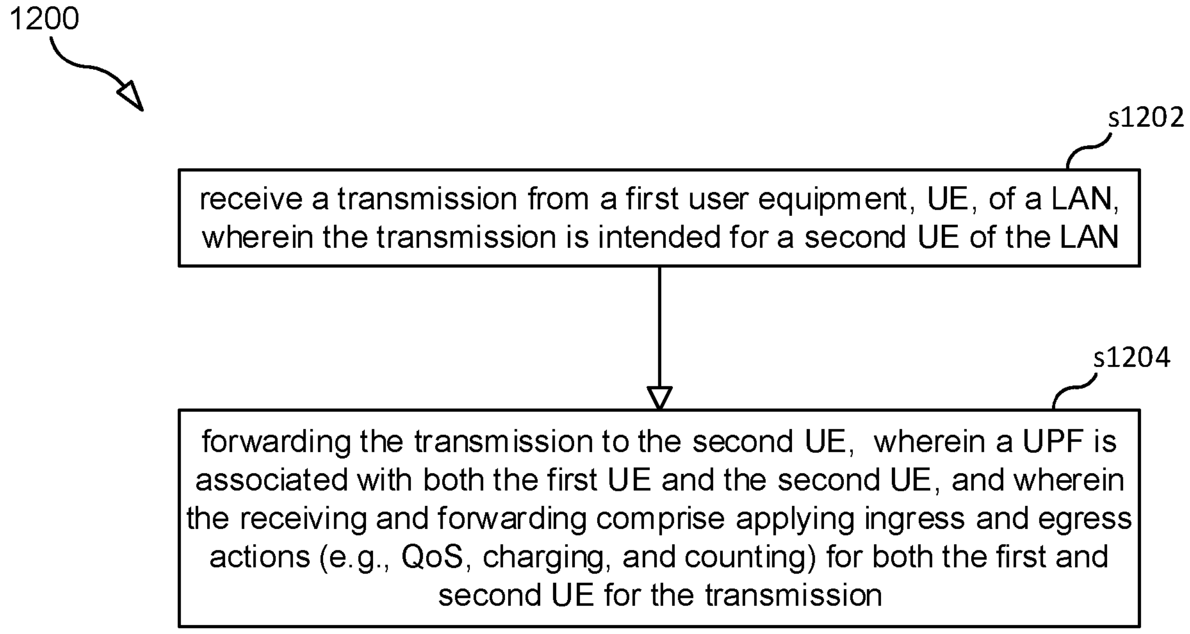

FIG. 12 is a flowchart illustrating a process 1000 for supporting a LAN (e.g., a 5G LAN). Process 1000 may begin in step s1202.

Step s1202 comprises a first user plane function, UPF, receiving a transmission from a first user equipment, UE, of said LAN, wherein said transmission is intended for a second UE of said LAN.

Step s1204 comprises forwarding said transmission to said second UE, wherein said UPF is associated with both said first UE and said second UE, and wherein said receiving and forwarding comprise applying ingress and egress actions (e.g., QoS, charging, and counting) for both the first and second UE for said transmission.

Steps s1202 and S1204, in some embodiments, are performed by a UPF.

Figure 13:
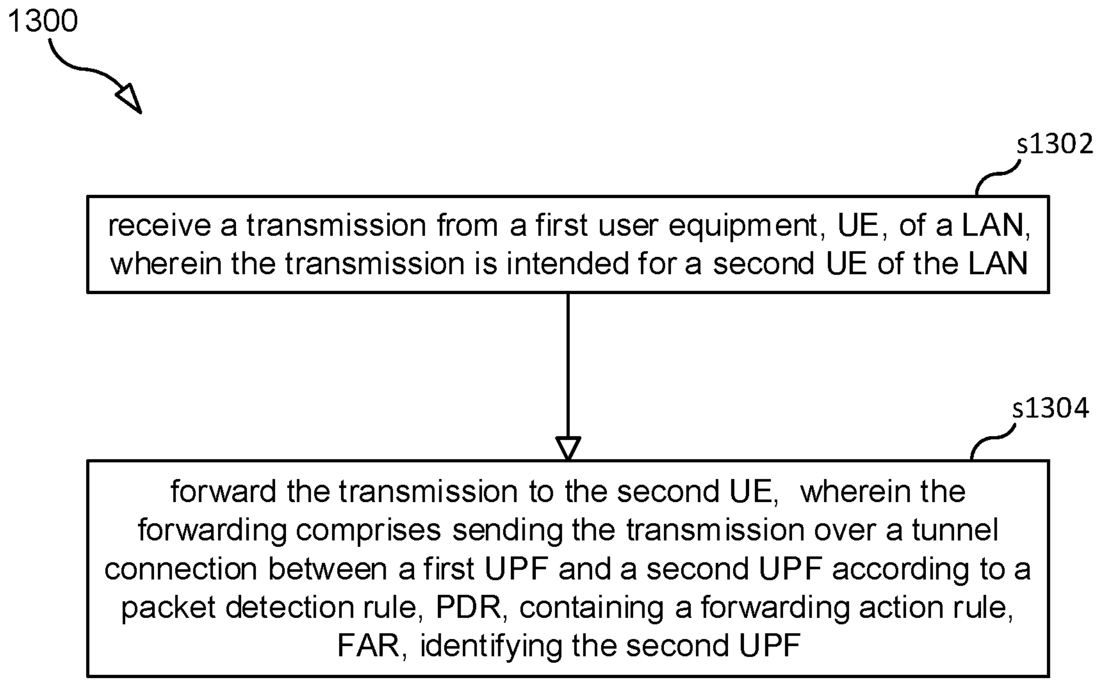

FIG. 13 is a flowchart illustrating a process 1300 for supporting a LAN (e.g., a 5G LAN). Process 1300 may begin in step s1302.

Step s1302 comprises a first user plane function, UPF, receiving a transmission from a first user equipment, UE, of said LAN, wherein said transmission is intended for a second UE of said LAN.

Step s1304 comprises forwarding said transmission to said second UE, wherein said forwarding comprises sending said transmission over a tunnel connection between said first UPF and a second UPF according to a packet detection rule, PDR, identifying a forwarding action rule, FAR, identifying said second UPF (e.g., the FAR contains an address allocated to the second UPF).

Steps s1302 and S1304, in some embodiments, are performed by a UPF.

Figure 14:
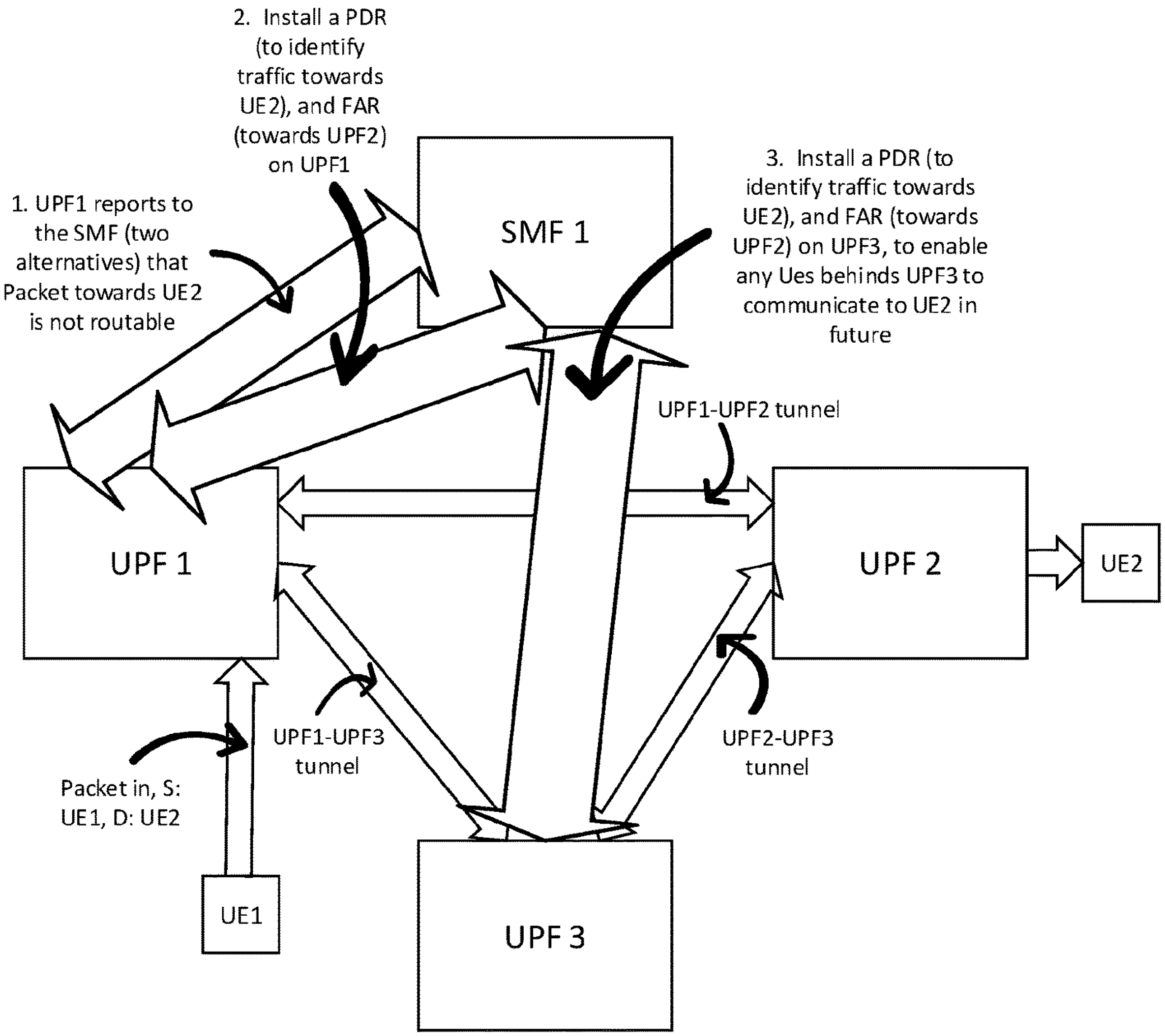
FIG. 14 is an example message flow diagram illustrating a system and process according to embodiments.

Referring to FIG. 14 a node and signal flow diagram for system 1400 is provided according to some embodiments. In this example, when the SMF gets the query for a destination UE (UE2 in this example), it will install a PDR (to identify the UE-UE traffic towards UE2) and FAR (to forward the traffic to the UPF2) in both UPF1 and UPF3. In this way, the forwarding table in the UPFs will be completed. According to embodiments, subsequently, if the UE2 moves to the UPF3, and UE 1 would like to communicate to the UE2, and such UE-to-UE traffic is sent to the UPF2, while UPF2 has no entry to forward the traffic to the UE2, as local switch part for UE2 is removed once the UE2 is left. So the UPF2 asks for the SMF, and the SMF install PDR/FAR in the UPF1, so the old entry in UPF1 for UE2 is removed. In some instances, it is assumed the old PDR/FAR to forward traffic towards UE2 via UPF2 is removed once the UE2 is attached to the UPF3 directly. In flow (1) of FIG. 3, UPF1 reports to the SMF (according to alternatives described herein) that a packet towards UE2 is not routable. In flow (2) of FIG. 10, a PDR is installed (to identify traffic towards UE2) and a FAR (towards UPF2) on UPF1. In flow (3) of FIG. 14, a PDR is installed (to identify traffic towards UE2), and a FAR (towards UPF2) on UPF3 to enable any UEs behind UPF3 to communicate to UE2 in the future. In this example, a tunnel is provided between each of the UPFs 1-3, respectively.

According to some embodiments, whenever a new UE of a group/LAN is recognized, new PDR/FARs are provided. This could occur, for instance, upon establishing a new N3 or N4 session fur such a UE.

According to some embodiments, an apparatus is provided that is adapted to perform the steps of any of FIGS. 4-13.

According to some embodiments, a computer program is provided, comprising instructions which, when executed on at least one processor, cause the at least one processor to carry out a process according to any of FIGS. 4-13. According to some embodiments, a carrier is provided containing the computer program, wherein the carrier is one of an electronic signal, optical signal, radio signal, or computer readable storage medium.

According to some embodiments, an apparatus for supporting a local area network, LAN (e.g., a 5G LAN) is provided, comprising a processor and a memory, said memory containing instructions executable by said processor whereby said apparatus is operative to perform the steps of any of FIGS. 4-13.

According to some embodiments, a computer program comprising computer program code stored on a non-transitory computer readable medium is provided, which, when run on a network node causes the network node to perform the steps of any of FIGS. 4-13.

Figure 15:
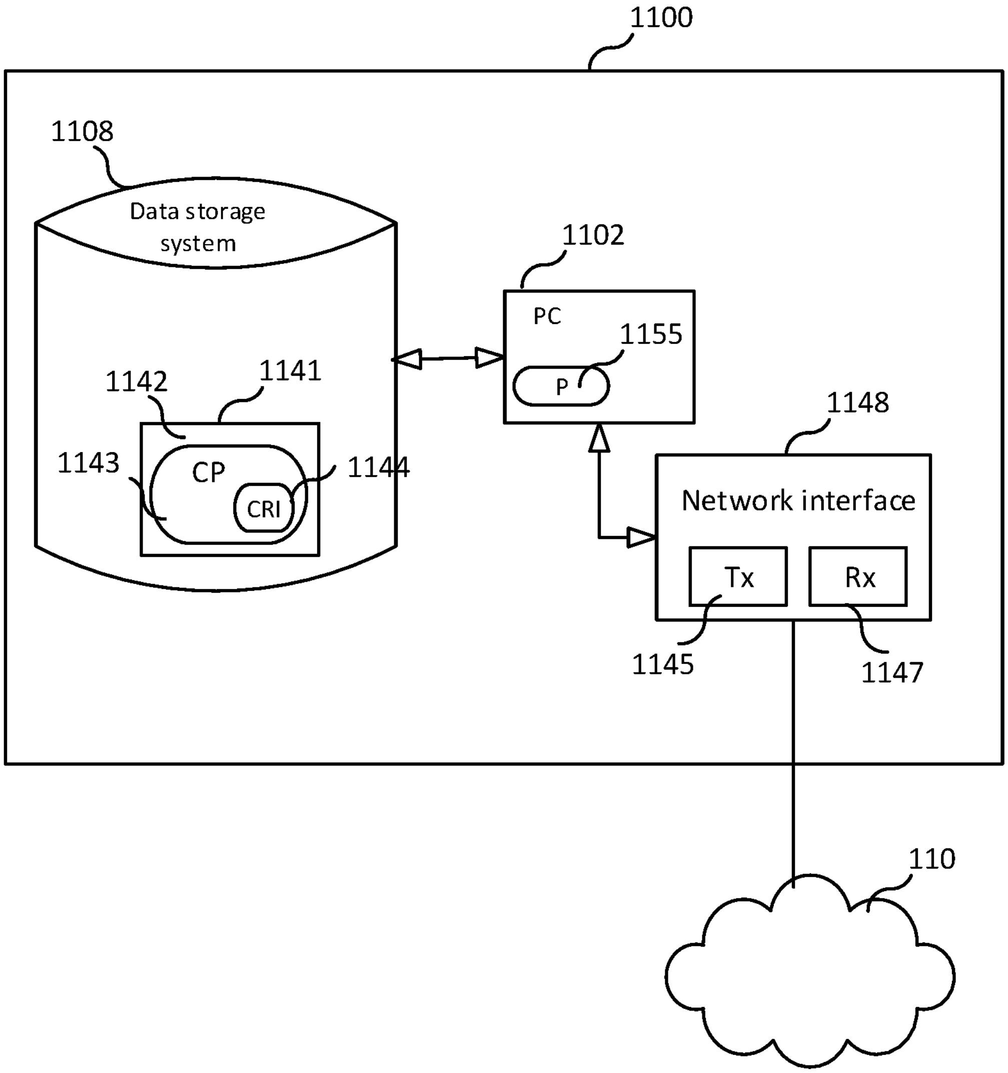
FIG. 15 is a block diagram of an apparatus according to embodiments.

FIG. 15 is a block diagram of an apparatus 1500, which may implement a UPF and/or an SMF, according to some embodiments. As shown in FIG. 15, apparatus 1500 may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 1548 comprising a transmitter (Tx) 1545 and a receiver (Rx) 1547 for enabling apparatus 1500 to transmit data to and receive data from other nodes connected to a network 150 (e.g., an Internet Protocol (IP) network) to which network interface 1548 is connected; and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes apparatus 1500 to perform steps described herein (e.g., steps described herein with reference to any of the flowcharts). In other embodiments, apparatus 1500 may be configured to perform steps described herein without the need for code. That is, for example, PC 1502 may consist merely of one or more ASICs. Hence, the features of the embodiments described herein may be implemented in hardware and/or software.

EMBODIMENTS

A1. A method for supporting communication between UEs camping on a local area network, LAN (e.g., a 5G LAN), the method being performed by a user plane function, UPF, the method comprising:

receiving a transmission (e.g., a GTP-U PDU transmitted by a access network node or a PDU transmitted by another UPF over an Nx interface) comprising a protocol data unit, PDU, transmitted by a first user equipment, UE, wherein the PDU includes at least a destination address of a second UE;

using information included in the transmission to find a first packet detection rule, PDR, matching information included in the transmission (e.g. a source address and a destination address of the PDU), wherein the first PDR identifies a first forwarding action rule, FAR, wherein the first FAR includes an indication (e.g., Destination Interface set to "5G-LAN internal") indicating that the PDU requires further ingress processing (i.e., indicating that another PDR matching process is needed for the PDU);

enforcing the first FAR (e.g., sending the PDU to the UPF's routing engine using the network instance identifier and the 5G LAN Internal interface as included in the FAR, so that the routing engine can perform the another PDR matching process to find a second PDR for the PDU);

finding a second PDR for the PDU (e.g., the second PDR is found after identifying a second N4 session for the PDU and by matching the PDU with packet detection information, PDI, included in the second PDR), wherein the second PDR identifies a second FAR; and enforcing the second FAR, wherein enforcing the second FAR comprises using information included in the second FAR to forward the PDU to the second UE.

A1.1. The method of embodiment A1, wherein the step of using information included in the transmission to find the first PDR comprises using information included in the transmission (e.g., a local TEID allocated earlier for the PDU session of the first UE (to receive GTP-U PDU from a access network) or a local TEID allocated earlier for an N4 session created for a specific 5G LAN group (to receive GTP-U PDU from the first UPF)) to identify a first N4 session (e.g., an N4 session corresponding to the 5G LAN group or an N4 session corresponding to the PDU transmitted by the first UE) prior to finding the first PDR, and the first PDR is associated with the identified N4 session.

A1.2. The method of any previous embodiment, wherein the transmission comprises an outer header (e.g., GTP-U header) to which the PDU is appended, and the first PDR includes an instruction to remove the outer header.

A1.3. The method of any previous embodiment, wherein the first PDR includes first PDI to enable the first UPF to identify the PDU as pertaining to a 5G LAN group traffic (e.g., the PDI specifies a source and destination address range, or any other significant bit(s) in the PDU which can be used to identify the application used for the communication within a given 5G LAN group).

A2. The method of any of the previous embodiments, wherein the first FAR includes a Destination Interface Information Element, IE, containing an interface value (e.g., a value greater than 4 and less than 16), and the indication indicating that the PDU requires further ingress processing is the interface value of the Destination Interface IE.

A3. The method of embodiment A2, wherein the first FAR further includes a Network Instance IE that contains a network instance value identifying a particular 5G LAN group.

A3.1: The method of embodiment A1, wherein the second PDR includes second PDI to match the PDU incoming from the source interface, e.g. 5G LAN Internal, and a network domain (e.g. a IP domain) specific for the 5G LAN group traffic identified by a Network Instance.

A3.1.1: The method of embodiment A3.1, wherein the second PDI includes at least a packet flow description where the destination IP address is set to the IP address belonging to the second UE.

A3.2: The method of embodiment A1, wherein the second N4 session is an N4 session created for a PDU session of the second UE or the second N4 session is an N4 session created for a specific 5G LAN Group which is shared by all UEs pertaining to a same 5G LAN group, to enable communication for UEs when they are served by different UPFs and forwarding the packets directly to the Packet Data Network over N6.

A4. The method of any of the previous embodiments, wherein the first UPF serves the second UE and forwarding the PDU to the second UE comprises the UPF forwarding the PDU to an access network node (e.g., a 5G-AN node) using a tunnel (e.g., an N3 GTP-U tunnel) established between the first UPF and the access network node.

A5. The method of embodiment A4, wherein the second FAR includes a Destination Interface IE containing an interface value set to Access (i.e., set to 0).

A6. The method of any one of the previous embodiments, wherein forwarding the PDU to the second UE comprises:

the first UPF forwarding the PDU to a second UPF (which may be the UPF serving the second UE or a UPF between the first UPF and the UPF serving the second UE) using a tunnel (e.g., an N9 GTP-U tunnel) established between the first UPF and the second UPF, or the first UPF forwarding the PDU to a packet data network (e.g., using an N6 interface).

A7. The method of embodiment A6, wherein the second FAR includes a Destination Interface IE containing an interface value (e.g., "5G LAN Nx") that indicates that the UPF should forward the PDU to the second UPF using a tunnel established between the first UPF and the second UPF.

A7.1 The method of embodiment A6, wherein the second FAR includes a Destination Interface IE containing an interface value (e.g., Core) that indicates that the UPF should forward the PDU to a packet data network over an N6 interface.

A7.2 The method of embodiment A7, wherein the second FAR further includes a Network Instance IE identifying a network domain (e.g., an IP domain) specific for 5G LAN group traffic.

A8. The method of any one of embodiments A3, wherein the second PDR includes a Source Interface IE containing an interface value that is set to the same value as the interface value of the Destination Interface IE included in the first FAR, and the second PDR includes a Network Instance IE containing an network instance value that is set to the same value as the network instance value of the Network Instance IE included in the first FAR.

A9. The method of any one of the previous embodiments, wherein the first PDR comprise a usage reporting rule, URR, identifier identifying a first URR, the second PDR comprise a URR identifier identifying a second URR, and the method further comprises:

the first UPF applying the first URR with respect to the PDU; and the first UPF applying the second URR with respect to the PDU.

A10. The method of embodiment A9, wherein the first URR identifies a method for measuring a network resource usage, and applying the first URR with respect to the PDU comprises measuring the network resource usage with respect to the PDU.

B1. A method for supporting communication between UEs camping on a local area network, LAN (e.g., a 5G LAN), the method being performed by a user place function, UPF, the method comprising:

receiving a transmission (e.g., a GTP-U PDU transmitted by a access network node or a PDU transmitted by another UPF over an Nx interface) comprising a protocol data unit, PDU, transmitted by a first user equipment, UE, wherein the PDU includes at least a destination address of a second UE;

using information included in the transmission to find a first Packet Detection Rule, PDR, matching information included in the transmission (e.g. a source address and a destination address of the PDU), wherein the first PDR identifies a first forwarding action rule, FAR, wherein the first FAR includes an indication (e.g., Destination Interface set to "5G-LAN internal") indicating that the PDU requires further ingress processing (i.e., indicating that another PDR matching process is needed for the PDU);

obtaining information included in the first FAR (e.g., reading the value of the Destination Interface IE included in the FAR);

after obtaining the information included the first FAR, identifying an N4 session; and after identifying the N4 session, finding a default PDR associated with the N4 session, wherein the default PDR identifies a default FAR and/or a default URR, wherein the default FAR is configured to cause the UPF to transmit the PDU to a Session Management Function, SMF, or the default URR is configured to cause the UPF to transmit to the SMF a PFCP Session Report Request message comprising at least a portion of the PDU (e.g., the destination IP address included in an IP header of the PDU).

B2. The method of embodiment B1, further comprising:

transmitting the PDU to the SMF; and after transmitting the PDU to the SMF, receiving from the SMF a second PDR associated with the second N4 session and receiving a second FAR, wherein the second PDR includes a FAR identifier identifying the second FAR.

B3. The method of embodiment B1, further comprising:

transmitting the PFCP Session Report Request message to the SMF; and after transmitting the PFCP Session Report Request message to the SMF, receiving from the SMF a second PDR associated with the second N4 session and receiving a second FAR, wherein the second PDR includes a FAR identifier identifying the second FAR.

C1. A method for supporting communication between UEs camping on a local area network, LAN (e.g., a 5G LAN) within 5G Core Network, the method being performed by a Session Management Function, SMF, the method comprising:

receiving a transmission transmitted by a first user plane function, UPF, as a result of the first UPF determining that a PDU is not routable, wherein the PDU includes a source address field containing an address of a first UE and a destination address field containing an address of a second UE, and wherein the transmission comprises 1) the PDU or 2) a PFCP Session Report Request message that comprises the address of the second UE;

determining a UPF that is currently serving the second UE;

after determining the UPF that is currently serving the second UE, provisioning to the first UPF a PDR for enabling the first UPF to route towards the second UE PDUs that are addressed to the second UE C1.1 The method of embodiment C1, wherein the PDR is in an N4 session specifically created for a 5G LAN group to which the first and second UEs belong.

C2. The method of embodiment C1, further comprising:

provisioning to a second UPF a second PDR for enabling the second UPF to route towards the second UE PDUs that are addressed to the second UE and intended for the said 5G LAN group.

C2.1. The method of embodiment C2, wherein the said second PDR includes an instruction to remove the outer header of the PDU received from the Source Interface 5G LAN Nx and a network domain specific (e.g. an IP domain) identified by the Network Instance, and the said second PDR is associated with a FAR.

C2.2. The method of embodiment C2.1, wherein the FAR includes a Destination Interface IE containing an interface value (e.g., "5G LAN Internal") and Network Instance is set to a value specific for the 5G LAN Group that indicates that the second UPF enforcing the FAR, e.g. by sending the PDU to the UPF's routing engine using the network instance identifier and the 5G LAN Internal interface as included in the FAR, so that the routing engine can perform the another PDR matching process to find another PDR in second UEs N4 session that for the PDU).

C3. The method of embodiment C1, wherein the SMF generates the PDR based on the UPF that is currently serving the second UE (e.g., if a second UPF is serving the second UE, then PDR will contain a FAR identifier that identifies a FAR having a Destination Interface IE set to, e.g., 5G LAN Nx, and a Network Instance identifying a network domain (e.g. a IP domain) specific for the 5G LAN group traffic).

D1. A method performed by a Session Management Function, SMF, of a 5G Core Network, the method comprising:

generating a first packet detection rule, PDR, associated with a first N4 session associated with a first UE or associated with a 5G LAN group, the first PDR containing a forwarding action rule, FAR, identifier for identifying a first FAR;

generating the first FAR, wherein the first FAR includes an indication (e.g., Destination Interface set to "5G-LAN internal") indicating that the PDUs that match the first PDR require further ingress processing (i.e., indicating that another PDR matching process is needed for the PDUs); and providing the first PDR and the first FAR to a first user plane function, UPF (e.g., the UPF selected to serve the first UE).

D2. The method of embodiment D1, wherein the SMF provides the first PDR to the first UPF by transmitting to the first UPF a session request (e.g., a session creation request or a session modification request) comprising the first PDR.

D3. The method of embodiment D1 or D2, further comprising:

generating a second PDR associated with a second N4 session, the second PDR containing a FAR identifier for identifying a second FAR;

generating the second FAR; and providing the second PDR and the second FAR to the first UPF, wherein the Destination Interface IE of the second FAR is set to Core, Access or 5G LAN Nx (e.g., a value greater than 4 and less than 16).

D3.1 The method of embodiment D2, wherein the Network Instance IE of the second FAR is set to a value identifying a network domain (e.g. a IP domain) specific for the 5G LAN group traffic.

D4. The method of embodiment D3, wherein the second PDR is associated with an N4 session created for a specific 5G LAN group and the Destination Interface IE of the second FAR is set to 5G LAN Nx.

D5. The method of embodiment D3, wherein the second PDR is associated with an N4 session associated with a second UE and the Destination Interface IE of the second FAR is set to Access.

E1. A computer program, comprising instructions which, when executed on at least one processor, cause the at least one processor to carry out the method according to any one of the previous embodiments.

E2. A carrier containing the computer program of embodiment E1, wherein the carrier is one of an electronic signal, optical signal, radio signal, or computer readable storage medium.

F1. An apparatus (e.g., an apparatus implementing a UPF or an SMF) adapted to perform the steps of any of the previous embodiments.

G1. A UPF adapted to perform the steps of any of the previous embodiments.

H1. An SMF adapted to perform the steps of any of the previous embodiments.

ADDITIONAL EMBODIMENTS

A1. A method for supporting a local area network, LAN (e.g., a 5G LAN), the method comprising:

generating a first packet detection rule, PDR, associated with a first user equipment, UE, the first PDR containing a forwarding action rule, FAR, identifier for identifying a first FAR;

generating the first FAR, wherein the first FAR includes: i) an indication (e.g., "internal", "5G-LAN") indicating that at least a second PDR (e.g., an ingress PDR) should be applied to packets that match the first PDR (e.g., a packet that matches packet detection information (PDI) included in the PDR) and/or ii) an identifier (e.g., N4 session identifier) for use in identifying a set of one or more PDRs; and providing the first PDR and the first FAR to a first user plane function, UPF, selected to serve the first UE, wherein the set of one or more PDRs is associated with i) a second UE or ii) a tunnel between the first UPF and a second UPF, and/or the second PDR is associated with i) a second UE or ii) a tunnel between the first UPF and a second UPF.

A2. The method of embodiment A1, wherein the first FAR includes the identifier, the identifier included in the first FAR is an N4 session identifier identifying an N4 session associated with the second UE, and each PDR included in the set of one or more PDRs contains the N4 session identifier.

A3. The method of embodiment A1 or A2, wherein the method is performed by a session management function, SMF, that provides session management functions for both the first UE and the second UE.

A4. The method of embodiment A3, wherein the SMF generates the first PDR and the first FAR after the second UE connects to the LAN.

A5. The method of embodiment A4, wherein the SMF provides the first PDR to the first UPF by transmitting to the first UPF a session modification request comprising the first PDR.

A6. The method of any one of embodiments A3-A5, further comprising the SMF receiving a transmission from the first UPF comprising an identifier (e.g., an IP address) associated with the second UE; and determining a UPF that is currently serving the second UE, wherein the SMF generates the first FAR based on the UPF that is currently serving the second UE.

A7. The method of embodiment A6, wherein the UPF serving the second UE is the second UPF and the set of PDRs and/or the second PDR is associated with the tunnel between the first UPF and the second UPF.

A8. The method of embodiment A6, wherein the UPF serving the second UE is the first UPF and the set of PDRs and/or the second PDR is associated with an N4 session identifier associated with the second UE.

A9. The method of any one of embodiments A6-A8, wherein the transmission from the first UPF comprises an uplink (UL) packet transmitted by the first UE, wherein the UL packet comprises an IP address allocated to the second UE.

A10. The method of any one of embodiments A6-A8, wherein the transmission from the first UPF comprises a Session Report Request message.

A11. The method of any one of embodiments A1-A10, wherein the FAR includes a destination interface attribute, and the indication is a destination interface value (e.g., "internal" and/or "5G-LAN") for the destination interface attribute.

A12. The method of any one of embodiments A1-A10, wherein the second PDR includes an indicator indicating that the second PDR applies to locally switched traffic (e.g., applies to a packet having a source that is on the LAN and having a destination that is on the LAN) and the method further includes providing the second PDR to the first UPF, or the set of PDRs includes a second PDR that includes an indicator indicating that the second PDR applies to locally switched traffic (e.g., applies to a packet having a source that is on the LAN and having a destination that is on the LAN) and the method further includes providing the second PDR to the first UPF.

A13. The method of embodiment A12, wherein the second PDR has a source interface attribute, and an indicator indicating that the second PDR applies to locally switched traffic is a source interface attribute value of the source interface attribute of the second PDR.

A14. The method of any one of embodiments A1-A13, wherein the first FAR includes:

i) the indication that at least a second PDR should be applied to packets that match the first PDR, and ii) the identifier (e.g., an N4 session identifier) for use in identifying a set of one or more PDRs, wherein the set of PDRs includes the second PDR.

B1. A method for supporting a local area network, LAN (e.g., a 5G LAN), the method comprising:

a first user plane function, UPF, receiving a transmission (e.g., a GTP-U PDU transmitted by a access network node) comprising a protocol data unit, PDU, transmitted by a first user equipment, UE, wherein the PDU includes a destination address of a second UE;

the first user plane function using information included in the transmission (e.g., a destination address of the PDU) to identify a first rule (e.g., a Packet Detection Rule, PDR) for the PDU, wherein the first rule identifies a first forwarding action rule, FAR;

after identifying the first rule, the first UPF retrieving the first FAR;

the first UPF using information included in the first FAR to identify a second rule for the PDU, wherein the second rule identifies a second FAR;

after identifying the second rule, the first UPF retrieving the second FAR; and the first UPF using information included in the second FAR to forward the PDU to the second UE.

B2. The method of embodiment B1, wherein the first UPF serves the second UE and forwarding the PDU to the second UE comprises the UPF forwarding the PDU to an access network node (e.g., a 5G-AN node) using a tunnel (e.g., an N3 GTP-U tunnel) established between the first UPF and the access network node.

B3. The method of embodiment B1, wherein a second UPF serves the second UE and forwarding the PDU to the second UE comprises the first UPF forwarding the PDU to the second UPF using a tunnel (e.g., an N9 GTP-U tunnel) established between the first UPF and the second UPF.

B4. The method of any one of embodiments B1-B3, wherein the first rule comprises a usage reporting rule, URR, identifier identifying a first URR, the second rule comprises a usage reporting rule, URR, identifier identifying a second URR, and the method further comprises:

the first UPF applying the first URR with respect to the PDU; and the first UPF applying the second URR with respect to the PDU.

B5. The method of embodiment B4, wherein the first URR identifies a method for measuring a network resource usage, and applying the first URR with respect to the PDU comprises measuring the network resource usage with respect to the PDU.

B6. The method of any one of embodiments B1-B5, further comprising:

the first UPF receiving a transmission transmitted by a UE wherein the transmission comprises a PDU that contains a destination address of a third UE;

the first UPF determining that the PDU matches a default PDR containing a FAR identifier that identifiers a third FAR;

the first UPF retrieving the third FAR, wherein the third FAR instructs the first UPF to forward the PDU to a session management function; and the first UPF forwarding the PDU to the SMF as instructed by the third FAR.

B7. The method of any one of embodiments B1-B5, further comprising:

the first UPF receiving a transmission transmitted by a UE wherein the transmission comprises a PDU that contains a destination address of a third UE;

the first UPF determining that the PDU matches a default PDR containing a rule identifier that identifiers a URR;

the first UPF retrieving the URR, wherein the URR instructs the first UPF to send to the SMF a report (e.g., a report containing the destination address of the third UE); and the first UPF sending the report to the SMF as instructed by the URR.

C1. A method for supporting a local area network, LAN (e.g., a 5G LAN), the method comprising:

generating a packet detection rule, PDR, identifying a forwarding action rule, FAR, wherein said PDR and/or FAR define how to route traffic from a first User Equipment, UE, of said LAN to a second UE of said LAN; and providing said PDR to a user plane function, UPF, wherein said UPF is associated with said first UE and said second UE, wherein said PDR and/or FAR enable said UPF to apply ingress and egress actions (e.g., QoS, charging, and counting) for both the first and second UE.

C2. The method of embodiment C1, wherein said PDR and/or FAR define how to route said traffic from said first UE to said second UE without use of an external Data Network (DN) (e.g., via N6).

D1. A method for supporting a local area network, LAN (e.g., a 5G LAN), the method comprising:

generating a first packet detection rule, PDR, identifying a forwarding action rule, FAR, wherein said PDR and/or FAR define how to route traffic (e.g., one or more packets) from a first user equipment, UE, of said LAN to a second UE of said LAN; and providing said PDR to a first user plane function, UPF, wherein said UPF is associated with said first UE, wherein said FAR comprises one or more instructions for said first UPF to route said traffic to a second UPF via a tunnel connection between said first and second UPFs (e.g., one or more instructions for causing the first UPF to add a particular header to a packet), and said second UPF is associated with said second UE.

D2. The method of embodiment D2, wherein said PDR and/or FAR define how to route said traffic from a said first UE to said second UE without use of an external Data Network (DN) (e.g., via N6).

E1. A method for supporting a local area network, LAN (e.g., a 5G LAN), the method comprising:

a first user plane function, UPF, receiving a transmission from a first user equipment, UE, of said LAN, wherein said transmission is intended for a second UE of said LAN; and forwarding said transmission to said second UE, wherein said UPF is associated with both said first UE and said second UE, and wherein said receiving and forwarding comprise applying ingress and egress actions (e.g., QoS, charging, and counting) for both the first and second UE for said transmission.

F1. A method for supporting a local area network, LAN (e.g., a 5G LAN), the method comprising:

a first user plane function, UPF, receiving a transmission from a first user equipment, UE, of said LAN, wherein said transmission is intended for a second UE of said LAN; and forwarding said transmission to said second UE, wherein said forwarding comprises sending said transmission over a tunnel connection between said first UPF and a second UPF according to a packet detection rule, PDR, identifying a forwarding action rule, FAR, identifying said second UPF.

G1. An apparatus adapted to perform the steps of any of embodiments A-F.

G2. A computer program, comprising instructions which, when executed on at least one processor, cause the at least one processor to carry out the method according to any one of embodiments A-F.

G3. A carrier containing the computer program of the previous embodiment, wherein the carrier is one of an electronic signal, optical signal, radio signal, or computer readable storage medium.

G4. An apparatus for supporting a local area network, LAN (e.g., a 5G LAN) comprising a processor and a memory, said memory containing instructions executable by said processor whereby said apparatus is operative to perform the steps of any of embodiments A-F.

G5. A computer program comprising computer program code stored on a non-transitory computer readable medium, which, when run on a network node causes the network node to perform the steps of any of embodiments A-F.

While various embodiments are described herein (including the attached Appendix which contains a proposal to modify a 3GPP standard), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

As stated above, see e.g. par. 0016, network functionality may be implemented either as a network element on dedicated hardware, as a software instance running on a dedicated hardware, or as a virtualized function instantiated on an appropriate platform, e.g., a cloud infrastructure. As also stated above, see par. 0026, a virtual network capable of supporting 5G LAN-type service may be referred to as 5G LAN-virtual network, or for simplicity reasons simply referred to as 5G VN. (Abbreviation VN e.g. used in par. 0007, 6.29.1.3, PDU session management 5G LAN-type service, of the Background.)

Thus, according to exemplary embodiments, when herein referring to 5G LAN group, what is considered may be 5G VN group, and/or when herein referring to 5G LAN internal (switching), what is considered may be 5G VN internal (switching).

Generally, for evolving network architectures interfaces for which no number yet has been assigned are referred to as x. For 5G system architecture interfaces are referred to as N, together with a number. I.e., interface Nx referred to herein simply refers to an interface of a 5G system architecture not yet assigned a specific number.

According to exemplary embodiments the Nx interface is an N19 interface. Thus, according to embodiments an Nx interface may be a N19 interface, and/or by Nx forwarding N19 forwarding is considered.

In the light of the above, according to embodiments 5G LAN Nx (interface) may be a 5G VN N19 (interface).

APPENDIX

I. Introduction

This appendix discusses solutions for how SMF can control the different traffic forwarding options used with 5G-LAN and proposes a way forward.

At SA2 #129-BIS it was agreed to support different options for routing of UP traffic within a 5G-LAN group:

There are types of traffic routing policies of 5GLAN communication:

(1) N6-based, it means all the UL/DL traffic for the 5GLAN communication is routed to/from the DN;

(2) Nx based, it means all the UL/DL traffic for the 5GLAN communication is routed between PSA UPFs of different PDU sessions; and (3) Local switch: traffic routed locally by a single UPF if it is the common PSA UPF of different sessions.

SMF generates PDU forwarding rules and provides them to the UPF.

The impact to N4 and UPF to support the above options is analyzed. The first approach (N6-based) requires nothing new as it is supported by the rel-15 baseline. The second approach (Nx based) and third approach (local switch) may or may not require enhancements to N4 depending on the requirements. This is further analyzed below.

II. Discussion

A. Local Switch in UPF

Local switch forwarding in UPF requires that UL/DL user data traffic is switched in UPF between a PDU Session (for a UE as a 5G-LAN group member) controlled by a N4 session and another PDU session (for another UE as a member of the same 5G-LAN group) without being sent on any external interface (N6, N9 etc).

Rel-15 has some implied support for this, but it is targeting Ethernet PDU Sessions only and it is not explicit, e.g. as described in TS 23.501, clause 5.8.2.5:

Local policies in UPF associated with the Network Instance can prevent local traffic switching in the UPF between PDU Sessions either for unicast traffic only or for any traffic. In the case where UPF policies prevent local traffic switching for any traffic (thus for broadcast/multicast traffic) some mechanism such as ARP/ND proxying or local multicast group handling is needed to ensure that upper layer protocol can run on the Ethernet PDU sessions.

To perform local switch in UPF, the UPF would need to receive an UL packet for one PDU Session and perform the related processing (PDR, QER, URR, FAR) and send it as DL on another PDU Session after performing the related processing for that PDU Session (PDR, QER, URR, FAR). A question here is how the egress for the UL processing can be connected to the ingress of the DL processing. For example, can a FAR for the UL traffic be connected to a PDR for DL traffic?

It would be possible to leave the "local switch" to SMF/UPF implementations based on local configuration to perform the local switch. The SMF can e.g. provide a specific Network Instance value in the FAR that the UPF will interpret such that the traffic should not be sent onto any external interface but rather be fed back to internal processing (PDR classification) again. The same Network Instance value can then be used in the PDR(s) for UEs belonging to the same 5G-LAN group, though a Network Instance normally denotes an IP domain outside the UPF and it is connected to either a Source Interface or a Destination Interface. This option has no new N4 requirements but SMF-UPF interoperability may be limited. A problem is also that there is no suitable value for the "Destination Interface" and "Source Interface" parameters in the FAR and PDR respectively. Currently these parameters can take the following values, indicating that in all cases the packets are sent/received to/from an external interface:

TABLE 1

Current values for "Destination Interface" and "Source Interface" parameters in the FAR and PDR (from TS 29.244)

| Interface value | Values (Decimal) |
|---|---|
| Access | 0 |
| Core | 1 |
| SGi-LAN/N6-LAN | 2 |
| CP- Function | 3 |
| LI Function | 4 |
| Spare | 5 to 15 |

Observation 1: Leaving "local switch" to SMF/UPF configuration using "Network Instance" reduces interoperability and causes problems for the "Destination Interface" and "Source Interface" fields.

Therefore, it is preferable to standardize a new value for "Source Interface" and "Destination Interface" to denote a UPF-internal interface. It could be straightforward to add a new value (e.g. "5G LAN Internal") to instruct the UPF to route via local switch.

The Network Instance value could still be used to ensure traffic separation between 5G-LAN groups, to ensure that traffic from one 5G-LAN group does not get mixed with traffic for another 5G-LAN group or for non-5G-LAN group related traffic. The Network Instance value could e.g. be set to a value representing the 5G-LAN group.

Proposal 1: A new value ("5G LAN internal") for "Destination Interface" and "Source Interface" to denote local switch is defined. This together with a number of Network Instances for each 5G LAN Group respectively to ensure traffic separation provides a consistent and interoperable solution for local switch.

Figure 16:
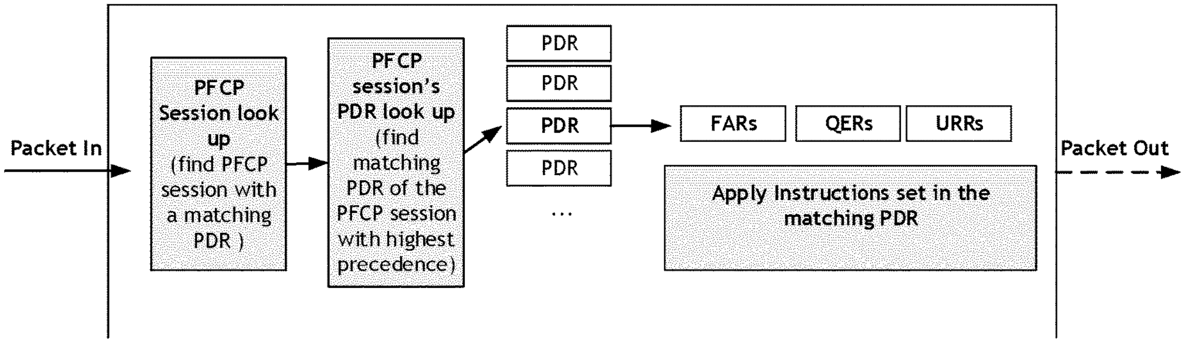
FIG. 16 is an exemplary "call flow", illustrating the handling in UPF, according to embodiments.

The figure and simple "call flow" of FIG. 16 illustrates the handling in UPF.

As specified in TS 29.244, clause 5.2.1, the packet forwarding model as shown in FIG. 16, the incoming packets will be matched in the UPF in two steps, first to find the PFCP Session, then to match one of PDRs in that PFCP Session.

So, to support the Local Switch scenario an example is provided in FIG. 17. In the example it is assumed that UE1 and UE2 belong to a 5G LAN group 1, and they have a PSA in the same UPF.

FIG. 1. Local Switch in UPF

1. The UPF receives an incoming packet which is intended for UE2 from RAN (Source Interface="Access") and identifies UE1's N4 session based on the Local TEID allocated by the UPF earlier;
2. The UPF finds a PDR in that N4 session to match the packet, where the PDR is identifying the packets is intended for UE to UE communication in 5G LAN Group 1, e.g. towards the UE2 which is served by the same UPF;

NOTE 1: In this step, the packets will be identified for UE to UE communication, e.g. for UE2, the purpose is to send the packet (after being removed the Outer header) back to ingress, with setting Destination Interface 5G LAN Internal, Network Instance 5G LAN Group 1, so that the packet can be match to the PDRs either provisioned for UE2's N4 session, or N4 session for 5G LAN Group 1.3. The FAR associated with the matching PDR includes Destination Interface="5G LAN internal" together with a Network Instance "5G LAN Group 1", this will trigger that the packet after being removal of Outer GTP-U header is sent back the ingress, e.g. routing engine and therefore the UPF will again identify the N4 Session according to the Packet Forwarding Model;

4. The UPF identifies the N4 Session for the UE2 by matching the PDR defined in that N4 session, based on UE2's Destination Address and Source Interface set to "5G-LAN Internal";

NOTE 2: Only one PDR is provisioned to match the packets intended to the UE2 from 5G LAN Group, i.e. from the Source Interface 5G LAN Internal, Network Instance 5G LAN Group 1.

5. The UPF processes the associated FAR to that PDR, adds an Outer Header which is set to the remote TEID allocated for UE2's PDU Session to the packet, together with Destination Interface set to "Access"), so that the UE3 will be able to receive the packet.

B. Nx Based Forwarding

Nx based forwarding requires that UL/DL data traffic is switched between a PDU Session (for a UE which is a 5G-LAN group member) controlled by a N4 session served by a UPF and another PDU session (for another UE which is member of the same 5G-LAN group) controlled by another N4 session served by another UPF. The UL/DL data traffic is carried in a shared tunnel (Nx) per 5G LAN Group between the two UPFs.

One main question here is if the shared tunnel requires its own N4 session or not.

If there is no requirement to associate the shared tunnel with a certain QoS, usage reporting etc, it is straight forward for the SMF to simply provide PDRs and FARs associated to the N4 session of each PDU Session. For example, in UL, a N4 session may have a PDR with a certain destination MAC address of another 5G-LAN group member, and a FAR instructing the UPF to send the matching packets with the TEID of the shared tunnel. The packets would be enforced according to the PDU Session's QER, URR etc.

However, if there are associated QoS, usage reporting, requirements on this shared tunnel, e.g. to enforce all packets on a tunnel to a certain bit rate or to count the volume on the shared tunnel, it gets more complex. Furthermore, a drawback with this approach is that each N4 session for a UE need to be updated to include the destination addresses of other UEs belonging to the group but with other PSA UPFs. This may not be scalable if the number of UEs in the group is large.

Observation 2: Simply using each UE's N4 session to include FARs for forwarding packets onto Nx does not allow the Nx tunnel to be rate limited (if needed) and is also not very scalable in the number of 5G-LAN group UEs. See below (explanation)

NOTE: If there is no N4 session for 5G LAN Group 1, then the CP function has to provision a PDR in the UE1's N4 Session, to forward the packets towards the UPF2; this applies to all UEs in the UPF1 who want to communicate with the UE3 in the UPF2. Considering if the UE3 is moving from UPF2 to UPF3, there are many PDRs that need to be updated (huge signalling), while those UEs in the UPF1 may not communicate to the UE3 at all, that is not scalable. Instead, with a N4 session for the 5G LAN group 1, only one PDR needs to be updated. It is the same for the receiving side, in the N4 Session for UE3, the CP function need provision a PDR to match the packets received from Nx local TEID. This is applicable to all UE's N4 sessions where they may receive packets from Nx.

An possible solution would be to create a N4 session (called Nx session for sake of describing the solution) for the shared tunnel(s) per 5G LAN Group. This allows specific QER(s) and URR(s) associated with the shared tunnel, which can apply different QoS policy for different 5G LAN Groups.

The N4 session for the shared tunnel(s) would also allow to define a single PDR to match incoming packets with different source UE IP address to a UE served by the receiving UPF, and is thus more scalable that using the individual N4 sessions for each PDU Session.

This alternative however requires that the SMF can instruct the UPF to forward traffic between two N4 sessions (one is for a PDU Session, the other is for Nx Session) within a UPF, which is basically the same as for the "local switch" discussed above. The same principles thus apply.

Proposal 2: For Nx based forwarding, the SMF creates a group-level N4 session (for the Nx tunnels) and the same principle as for "local switch" is used to map up-link traffic from a PDU Session to the group-level N4 session.

However, for sending the packet out on the Nx tunnel, one can again consider whether the available values of "Destination Interface" and "Source Interface" are appropriate. The Nx tunnel does not seem to correspond to any of the values in the table 1 above. Therefore, a new value (e.g. "5G LAN Nx" would be reasonable.

Proposal 3: A new value for "Destination Interface" and "Source Interface" to denote Nx based forwarding (5G LAN Nx") is defined.

See FIG. 18 Nx-Based Forwarding in UPF

1. The UPF1 receives an incoming packet from RAN (Source Interface="Access") and identifies UE1's N4 session based on the local TEID allocated by the UPF earlier;
2. The UPF1 finds a PDR in that N4 session to match the packet, where the PDR is identifying the packets is intended for UE to UE communication in 5G LAN Group 1, e.g. towards the UE3, which is served by another UPF2;

NOTE 1: In this step, the packets will be identified for UE to UE communication, e.g. for UE2, the purpose is to send the packet (after being removed the Outer header) back to ingress, with setting Destination Interface 5G LAN Internal, Network Instance 5G LAN Group 1, so that the packet can be match to the PDRs either provisioned for UE2's N4 session, or N4 session for 5G LAN Group 1.

3. The UPF1 processes the FAR associated with the matching PDR, and it will forward the packet which has been removed the Outer GTP-U header back the ingress, e.g. routing engine, with setting Destination Interface to "5G LAN internal" together with a Network Instance "5G LAN Group 1", therefore the UPF will again to identify the N4 Session according to the Packet Forwarding Model;

4. The UPF1 then identifies the N4 Session matching the PDR based on UE3's Destination Address (Source Interface="5G-LAN Internal"). This points to the group-level N4 session created to match the 5G LAN Group 1 incoming and outing traffic in this UPF;
5. The UPF1 processes the associated FAR to that PDR, which leads the packet being added an Outer Header which set to the remote TEID allocated by the UPF2 to receive 5G LAN Group 1 traffic, together with Destination Interface set to "5G-LAN Nx";
6. The UPF2 receives the packet at its local TEID and identifies the N4 session based on the tunnel header (Nx tunnel header, that N4 session is created to match the 5G LAN Group 1 incoming and outing traffic in this UPF;
7. The UPF2 processes the associated FAR to that PDR, and it will forward the packet which has been removed the Outer GTP-U header back the ingress, e.g. routing engine, with setting Destination Interface to "5G LAN internal" together with a Network Instance "5G LAN Group 1", therefore the UPF will again to identify the N4 Session according to the Packet Forwarding Model;"

NOTE: Steps 6-7 can be skipped if the incoming packet is directly matching a PDR in UE3's N4 session, however such PDR then needs to be added in all UE's N4 sessions where they may receive packets from Nx.

8. The UPF2 identifies the N4 Session for the UE3 by matching the PDR defined in that N4 session, based on UE3's Destination Address and the Source Interface set to "5G-LAN Internal")
9. The UPF2 processes the associated FAR to that PDR, adds an Outer Header which set to the remote TEID allocated for UE2's PDU Session to the packet, together with Destination Interface set to "Access", so that the UE3 will be able to receive the packet.

C. How Manage a N4 (PFCP) Session for a 5G LAN Group:

When the packets are sent to ingress, with the Destination Interface "5G LAN Internal", a lookup is performed using PDRs with Source Interface "5G LAN Internal"; the UPF may NOT be able to find a PDR to match the packets, i.e. neither a PDR pertaining to a N4 Session where the UE is served by the same UPF (local switch scenario) nor a PDR in the N4 session created to match the 5G LAN Group 1 incoming and outing traffic in this UPF (Nx based forwarding).

For example, when UE1 tries to communicate with UE3 as disclosed in FIG. 18, but there is no PDR and FAR installed for the N4 Session for that 5G LAN group 1. In such case, the UPF shall be instructed to report this to the SMF; and this includes the following alternatives:

1. Reactive ("pull") approach: Provisioning a default PDR with least precedence value in the 5G LAN Group N4 session to match for the traffic received from "5G LAN Internal", to catch any unknown traffic;
   Either create a FAR, so forward such traffic to the SMF; upon receiving such user plane traffic, the SMF will figure out which UPF is serving the destination UE, therefore to provision relevant PDR/FAR to the UPF forwarding the packets, and any intermediate UPFs (for potential communication from a UE served by that UPF to the same destination UE), to enable it forward the traffic to the UPF serving the destination UE;
   Or, provision a new URR with a new reporting trigger, preferably called "Unknown 5GLAN traffic" and associated with the default PDR, so the UPF will send PFCP Session Report Request message, report to the SMF the packets for UE-to-UE traffic, i.e. the packets towards the destination UE IP address is not deliverable; so that the SMF can provision relevant PDR1a/FAR1a to the UPF for 5G LAN Group 1 N4 session, and any intermediate UPFs (for potential communication from a UE served by that UPF to the same destination UE), to enable it forward the traffic to the UPF serving the destination UE;

(as shown in FIG. 14, when the SMF gets the query for destination UE (UE2), it will install a PDR in the N4 Session for 5G LAN Group 1.

2. Proactive ("push") approach: Provision a PDR in the 5G LAN Group 1 N4 Session in the UPFs other than the one serving the UE when the UE is attached to the network.

It is proposed that it is left to SMF implementation whether to use reactive or proactive approach. It should however be kept in mind that the proactive approach may lead to a lot of unnecessary N4 signalling, i.e. provisioning PDRs to enable UE to UE communication when UEs are served by different UPFs even when such UEs may never communicate with each other.

The invention claimed is:

1. A method for supporting communication between user equipments (UEs) camping on a local area network (LAN), the method being performed by a user plane function (UPF) and comprising:
receiving a transmission comprising a protocol data unit (PDU) transmitted by a first UE, wherein the PDU includes at least a destination address of a second UE;
using information included in the transmission to find a first packet detection rule (PDR) matching information included in the transmission, wherein the first PDR identifies a first forwarding action rule (FAR), wherein the first FAR includes an indication indicating that the PDU requires further ingress processing;
obtaining information included in the first FAR;
after obtaining the information included the first FAR, identifying an N4 session; and
after identifying the N4 session, finding a default PDR associated with the N4 session, wherein the default PDR identifies a default FAR and/or a default usage reporting rule (URR), wherein
the default FAR is configured to cause the UPF to transmit the PDU to a Session Management Function (SMF), or
the default URR is configured to cause the UPF to transmit to the SMF Session Report Request message comprising at least a portion of the PDU.

2. The method of claim 1, further comprising:
transmitting the PDU to the SMF; and
after transmitting the PDU to the SMF, receiving from the SMF a second PDR and receiving a second FAR, wherein the second PDR includes a FAR identifier identifying the second FAR.

3. The method of claim 1, further comprising:
transmitting the Session Report Request message to the SMF; and
after transmitting the Session Report Request message to the SMF, receiving from the SMF a second PDR and receiving a second FAR, wherein the second PDR includes a FAR identifier identifying the second FAR.

4. A non-transitory computer readable medium storing a computer program comprising instructions that, when executed on at least one processor of an apparatus, cause the apparatus to perform the method of claim 1.

* * * * *